(12) United States Patent
Birsel et al.

(10) Patent No.: US 8,005,518 B1
(45) Date of Patent: Aug. 23, 2011

(54) CONFIGURABLE MULTI-DIMENSIONAL MEDIA DEVICE

(75) Inventors: Ayse Birsel, New York, NY (US); Bibi Seck, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 543 days.

(21) Appl. No.: 11/897,668

(22) Filed: Aug. 31, 2007

Related U.S. Application Data

(60) Provisional application No. 60/876,628, filed on Dec. 21, 2006.

(51) Int. Cl.
*H04M 1/00* (2006.01)

(52) U.S. Cl. ............... 455/575.1; 455/575.3; 455/90.3; 455/566; 455/569.1

(58) Field of Classification Search ............... 455/556.1, 455/556.2, 557, 575.3, 575.4, 90.2, 90.3, 455/566
See application file for complete search history.

(56) References Cited

U.S. PATENT DOCUMENTS

| | | |
|---|---|---|
| 328,342 A | 10/1885 | Robinson |
| 1,363,187 A | 12/1920 | Miller |
| D98,532 S | 2/1936 | Lewis |
| 2,210,652 A | 8/1940 | Dennett |
| 2,716,532 A | 8/1955 | Wysong, Jr. et al. |
| 2,914,872 A | 12/1959 | Goodrich |
| 2,938,248 A | 5/1960 | Hadary |
| D194,821 S | 3/1963 | Watko |
| 3,198,339 A | 8/1965 | Stolarz |
| 3,460,282 A | 8/1969 | Swirsky |
| 3,592,289 A | 7/1971 | Aysta et al. |
| 3,709,237 A | 1/1973 | Smith |
| 3,905,540 A | 9/1975 | Abert |
| 3,909,525 A | 9/1975 | Fagan |
| D251,082 S | 2/1979 | Petrie |
| 4,147,198 A | 4/1979 | Ytter |
| D256,138 S | 7/1980 | Tesar |
| 4,257,207 A | 3/1981 | Davis |
| 4,275,207 A | 6/1981 | Appleton et al. |
| RE30,777 E | 10/1981 | Ytter |
| D271,732 S | 12/1983 | Ytter |
| 4,531,564 A | 7/1985 | Hanna |
| 4,653,563 A | 3/1987 | Bannister |
| 4,703,160 A | 10/1987 | Narishima et al. |
| 4,912,866 A | 4/1990 | Bannister et al. |
| 4,919,421 A | 4/1990 | Vandeveld |
| D319,859 S | 9/1991 | Cutrone |
| D324,035 S | 2/1992 | Izaki |
| 5,092,385 A | 3/1992 | Beaulieu |
| 5,116,117 A | 5/1992 | Miyashita |

(Continued)

OTHER PUBLICATIONS

Bandai, Tamagotchi Connection. [Online] Jan. 30, 2008. <http://www.tamagotchi.com/products/index.php. >.

(Continued)

*Primary Examiner* — Duc M Nguyen
(74) *Attorney, Agent, or Firm* — Robert C. Kowert; Meyertons, Hood, Kivlin, Kowert & Goetzel, P.C.

(57) ABSTRACT

Examples of a configurable multi-dimensional media device is described, including a memory configured to store data, and a processor adapted to configure a plurality of segments into a shape, to determine one or more computing functions based on the shape, and to implement the one or more computing functions when the configuration is performed.

22 Claims, 23 Drawing Sheets

U.S. PATENT DOCUMENTS

| | | |
|---|---|---|
| 5,125,193 A | 6/1992 | Beaulieu |
| 5,128,662 A | 7/1992 | Failla |
| D330,194 S | 10/1992 | Izaki |
| 5,164,853 A | 11/1992 | Shimazaki |
| D332,449 S | 1/1993 | Watanabe |
| 5,220,952 A | 6/1993 | Beaulieu |
| 5,249,005 A | 9/1993 | Furuno |
| 5,253,898 A | 10/1993 | Mangione |
| 5,260,998 A | 11/1993 | Takagi |
| 5,287,909 A | 2/1994 | King et al. |
| D345,355 S | 3/1994 | Konno et al. |
| 5,375,641 A | 12/1994 | Schlueter |
| D361,064 S | 8/1995 | Fellinger |
| 5,515,900 A | 5/1996 | West et al. |
| 5,537,127 A | 7/1996 | Jingu |
| 5,537,766 A | 7/1996 | Nickens et al. |
| 5,544,436 A | 8/1996 | Lefkowitz |
| D378,088 S | 2/1997 | Ando |
| D382,122 S | 8/1997 | Thorp et al. |
| 5,697,547 A | 12/1997 | Kraus |
| D391,298 S | 2/1998 | Johnson et al. |
| 5,722,477 A | 3/1998 | Richter et al. |
| 5,778,959 A | 7/1998 | Guetschow |
| 5,790,371 A | 8/1998 | Latocha et al. |
| 5,797,089 A * | 8/1998 | Nguyen ............. 455/403 |
| 5,838,405 A | 11/1998 | Izumi et al. |
| 5,841,431 A * | 11/1998 | Simmers ............. 345/211 |
| D406,468 S | 3/1999 | Byers |
| 5,882,763 A | 3/1999 | Perttunen et al. |
| 5,901,222 A * | 5/1999 | Macor ............. 379/433.04 |
| D410,633 S | 6/1999 | Tsui |
| D413,885 S | 9/1999 | Irimajiri et al. |
| 6,065,778 A | 5/2000 | Dovel et al. |
| 6,144,358 A * | 11/2000 | Narayanaswamy et al. .. 345/102 |
| 6,189,594 B1 | 2/2001 | Carter |
| 6,222,507 B1 | 4/2001 | Gouko |
| D442,321 S | 5/2001 | Cheng |
| 6,257,263 B1 | 7/2001 | Brereton |
| 6,327,482 B1 * | 12/2001 | Miyashita ............. 455/566 |
| 6,343,006 B1 | 1/2002 | Moscovitch et al. |
| 6,396,924 B1 * | 5/2002 | Suso et al. ............. 379/433.13 |
| 6,449,143 B2 | 9/2002 | Rooyakkers et al. |
| 6,510,325 B1 * | 1/2003 | Mack et al. ............. 455/575.2 |
| 6,542,721 B2 * | 4/2003 | Boesen ............. 455/553.1 |
| 6,568,005 B2 | 5/2003 | Fleming et al. |
| 6,643,124 B1 | 11/2003 | Wilk |
| 6,661,404 B1 * | 12/2003 | Sirola et al. ............. 345/168 |
| D487,551 S | 3/2004 | Lee |
| 6,748,242 B1 * | 6/2004 | Dunleavy ............. 455/566 |
| D493,463 S | 7/2004 | Takahashi |
| 6,771,237 B1 | 8/2004 | Kalt |
| D496,938 S | 10/2004 | Ozolins et al. |
| D497,167 S | 10/2004 | Ozolins et al. |
| 6,801,796 B2 * | 10/2004 | Finke-Anlauff ............. 455/575.3 |
| 6,803,978 B2 | 10/2004 | Bayrle et al. |
| 6,842,338 B2 | 1/2005 | Iredale |
| 6,850,226 B2 * | 2/2005 | Finke-Anlauff ............. 345/169 |
| 6,876,876 B2 | 4/2005 | Uhlemann |
| 6,919,864 B1 | 7/2005 | Macor |
| 6,926,196 B2 | 8/2005 | Testerman et al. |
| 6,967,831 B2 | 11/2005 | Chuang |
| 6,968,056 B2 | 11/2005 | Barnett et al. |
| 7,095,387 B2 | 8/2006 | Lee et al. |
| 7,136,828 B1 | 11/2006 | Rebeske |
| 7,184,796 B2 | 2/2007 | Karidis et al. |
| 7,197,346 B2 | 3/2007 | Eromaki et al. |
| 7,213,632 B1 | 5/2007 | Goldstein et al. |
| D544,852 S | 6/2007 | Takamori et al. |
| D544,922 S | 6/2007 | Shaffer |
| D546,805 S | 7/2007 | Kim et al. |
| 7,248,903 B2 | 7/2007 | Yoda |
| D551,649 S | 9/2007 | Moon et al. |
| D555,127 S | 11/2007 | Park et al. |
| D560,072 S | 1/2008 | Willis |
| D560,229 S | 1/2008 | Yagi |
| D560,641 S | 1/2008 | Jung et al. |
| D562,794 S | 2/2008 | Kim et al. |
| 7,328,050 B2 | 2/2008 | Cheng et al. |
| 7,330,547 B2 | 2/2008 | Turcanu |
| 7,333,321 B2 * | 2/2008 | Sutton et al. ............. 361/679.09 |
| D563,362 S | 3/2008 | LaDelfa et al. |
| D563,371 S | 3/2008 | Kim et al. |
| D563,374 S | 3/2008 | Jung et al. |
| D568,285 S | 5/2008 | Lee et al. |
| D568,862 S | 5/2008 | Kim et al. |
| D572,686 S | 7/2008 | Jung et al. |
| D573,565 S | 7/2008 | Edwards |
| 7,398,114 B2 | 7/2008 | Gartrell |
| 7,400,908 B2 * | 7/2008 | Lehtonen ............. 455/566 |
| D576,601 S | 9/2008 | Yasuda et al. |
| 7,423,634 B2 | 9/2008 | Amiri |
| 7,433,721 B2 * | 10/2008 | Kuroda ............. 455/575.3 |
| D579,915 S | 11/2008 | Yeo |
| D584,726 S | 1/2009 | Morita |
| D585,444 S | 1/2009 | Verschoor |
| D585,888 S | 2/2009 | Watson et al. |
| D599,761 S | 9/2009 | Birsel et al. |
| D600,233 S | 9/2009 | Birsel et al. |
| 7,619,686 B2 * | 11/2009 | Tom ............. 348/376 |
| D609,203 S | 2/2010 | Birsel et al. |
| 2002/0196204 A1 | 12/2002 | Senn |
| 2004/0077388 A1 | 4/2004 | Crum |
| 2004/0198458 A1 * | 10/2004 | Kawamura ............. 455/566 |
| 2005/0099361 A1 | 5/2005 | Majer |
| 2005/0110702 A1 | 5/2005 | Aoki et al. |
| 2005/0111211 A1 | 5/2005 | Takeuchi |
| 2005/0164752 A1 | 7/2005 | Lau et al. |
| 2005/0230558 A1 | 10/2005 | Nakasuka |
| 2005/0288072 A1 * | 12/2005 | Kemppinen ............. 455/575.3 |
| 2006/0100004 A1 | 5/2006 | Kim et al. |
| 2007/0072657 A1 * | 3/2007 | Hyun et al. ............. 455/575.3 |
| 2008/0020811 A1 | 1/2008 | Lim et al. |
| 2008/0022841 A1 | 1/2008 | Braun et al. |
| 2008/0068288 A1 | 3/2008 | Henkel |
| 2008/0088580 A1 * | 4/2008 | Poupyrev et al. ............. 345/156 |
| 2008/0090608 A1 | 4/2008 | Kim et al. |
| 2008/0135504 A1 | 6/2008 | Braun et al. |
| 2008/0167095 A1 | 7/2008 | Kim et al. |
| 2008/0176610 A1 | 7/2008 | Pan et al. |
| 2008/0313857 A1 | 12/2008 | Eromaki |
| 2009/0000169 A1 | 1/2009 | Houssain et al. |
| 2009/0005130 A1 * | 1/2009 | Ishikura et al. ............. 455/575.3 |
| 2009/0111536 A1 * | 4/2009 | Tanaka ............. 455/575.3 |

OTHER PUBLICATIONS

Ramirez, Louis, Nokia's Foldable Phone Concept Leaves Your Pocket Smelling Fresh, Gizmodo, http://gizmodo.com/gadgets/smell-this/nokias-foldable-phone-concept-leaves-your-pocket-smelling-fresh-262266.php, May 21, 2007.

U.S. Appl. No. 20/291,494, filed Aug. 30, 2007; Entitled Media Device; Birsel, et al.

\* cited by examiner

CONFIGURABLE MULTI-DIMENSIONAL MEDIA DEVICE

CROSS-REFERENCE TO RELATED APPLICATIONS

This application claims the benefit of U.S. Provisional Patent Application No. 60/876,628 filed Dec. 21, 2006 and entitled "Configurable multi-side mobile computing," which is herein incorporated by reference for all purposes.

FIELD OF THE INVENTION

Examples of the present invention relates generally to communications and personal computing. More specifically, various techniques for a configurable multi-dimensional media device are described.

BACKGROUND OF THE INVENTION

Conventional mobile communication devices are typically small and portable, but often limited in functionality. Typical functions of conventional devices are implemented using mobile or cellular phones, portable digital assistant (PDA), smart phone (i.e., combined mobile or cell phone, PDA, and, in some examples, digital camera), digital camera, digital music player (e.g., player for song files in formats such as .mp3, .wav., and others), teleconferencing or video conferencing equipment, global positioning system (GPS) handheld units, and digital document scanning/imaging devices. However, conventional devices typically do not offer more than one function. Some conventional devices combine functions. However, conventional devices that combine functions are typically restricted in the number of functions that can be combined due to size, computing, memory, form factor, ergonomics, and other factors limit the number of functions that can be combined into a single device. Issues such as usability, form factors, ergonomic design, aestheticism, and consumer appeal significantly affect the types of functions implemented by conventional solutions. Thus, the limited number of functions that may be combined deters widespread adoption of conventional devices. For example, conventional solutions are limited in that users must purchase and learn to use several individual devices for video conferencing, media recording (e.g., MP3 players and other types of portable media players), download, and playback, mobile communication (e.g., cellular and mobile phones, personal data assistants (PDA), smart phones, and the like), image scanning, and others. Subsequently, conventional solutions are expensive and limited in usability and features. For example, conventional solutions for video conferencing typically require equipment configured for real-time video and audio capture and encoded transmission. These solutions are not only expensive and limited, but have a large footprint or chassis that is impractical for mobile solutions.

Thus, a solution for providing media device capabilities without the limitations of conventional techniques is needed.

BRIEF DESCRIPTION OF THE DRAWINGS

Various examples are disclosed in the following detailed description and the accompanying drawings.

DETAILED DESCRIPTION

Figure 1:
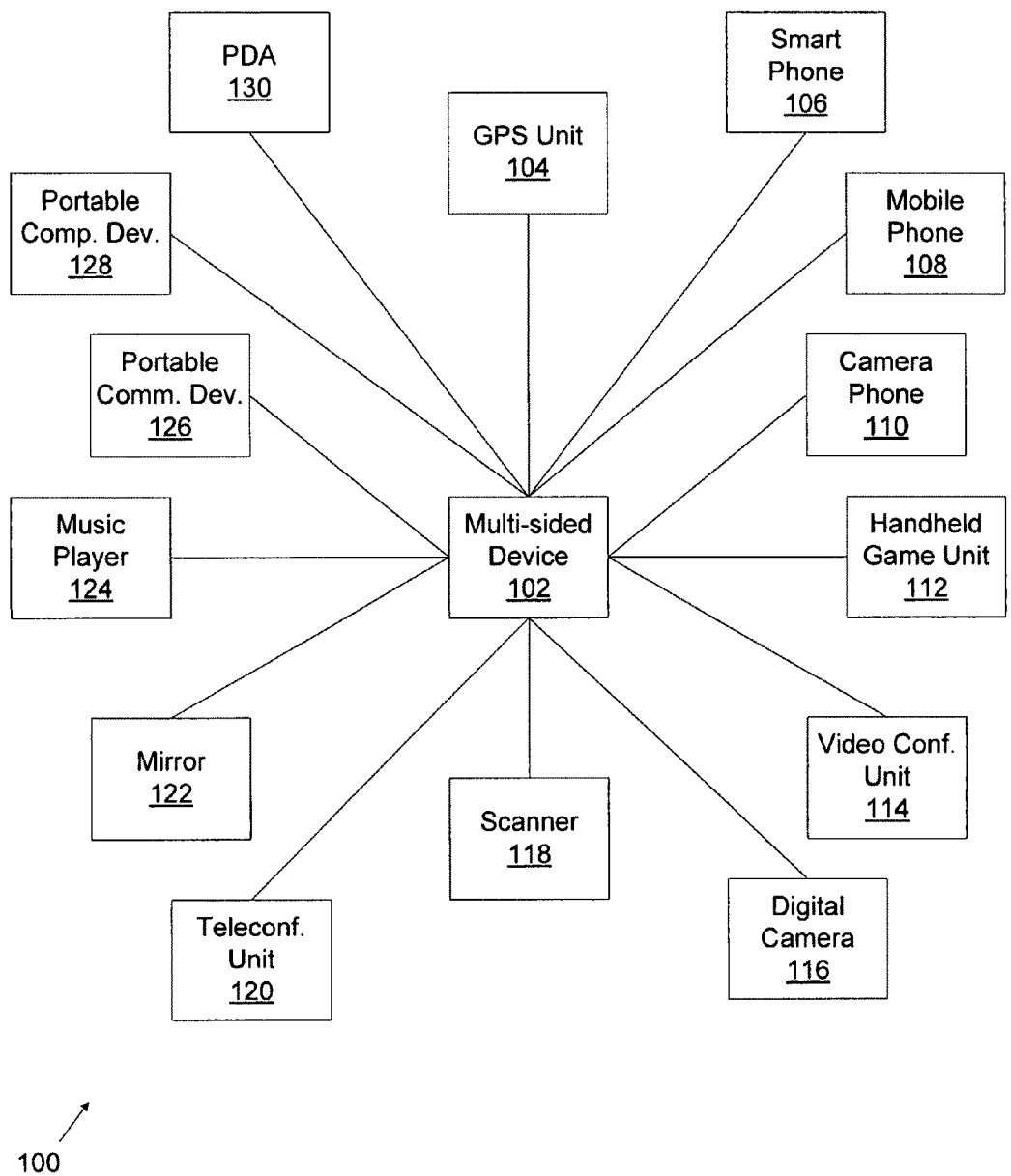
FIG. 1 illustrates exemplary types of configurable multi-dimensional media device.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as a standalone application or as a module or subcomponent of another application. The described techniques may be implemented as software, hardware, firmware, circuitry, or a combination thereof. If implemented as software, the described techniques may be implemented using various types of programming, development, or formatting languages, frameworks, syntax, applications, protocols, objects, or techniques, including C, Objective C, C++, C#, Flex™, Java™, Javascript™, AJAX, COBOL, Fortran, ADA, XML, HTML, DHTML, XHTML, HTTP, XMPP, and others. Design, publishing, and other types of applications such as Dreamweaver® and Fireworks® may also be used to implement the described techniques. If implemented as hardware, circuitry, firmware, or a combination thereof, any type of material, components (i.e., customized, off-the-shelf, or others), couplings, conductive or semi-conductive material, processor or memory components, circuits, wires, and others may be used. Materials may include flexible displays, circuitry, or other materials to enable the techniques and examples described herein. Further, the described techniques may be varied and are not limited to the examples or descriptions provided.

Examples of a configurable multi-dimensional media device and configurable multi-sided mobile computing are described, including providing a memory, a processor, a communications interface (e.g., a modem, analog/digital codec, analog transceiver, network interface card that may, for example, couple to a data communications network to transmit data via various protocols including Voice over Internet Protocol (VoIP), and others), and one or more display segments or panels (i.e., "panels") that may be twisted, deformed, manipulated, conformed, turned, articulated, or otherwise configured (hereafter "configured") to form various shapes that are associated with pre-defined, predetermined, or otherwise shape-defined sets of functionality. As used herein, configurable multi-dimensional media device and configurable multi-sided mobile computing may be referred to interchangeably without limitation. In some examples, panels may be articulated into shapes that enable cell or mobile phone communication, videoconferencing (i.e., with one or more parties in addition to a user), image capturing, media playback, media recording (e.g., video or audio recording), mirroring or image reflection, and others. When configured into a given shape, a configurable multi-dimensional media device may be used to implement various functions including those described herein. In other examples, functions beyond those described may also be implemented with various shapes of a configurable multi-dimensional media device and are not limited to the examples described. As used herein, a configurable multi-dimensional media device may also be interchangeably referred to as a configurable multi-sided mobile device.

FIG. 1 illustrates exemplary types of configurable multi-dimensional media device. Here, configurable multi-dimensional media device 102 may be implemented with various types of functionality, such as GPS unit 104, smart phone 106, mobile phone 108, camera phone 110, handheld game unit 112, video conference unit 114, digital camera 116, scanner 118, teleconference unit 120, mirror 122, music player 124, any type of portable communication feature 126, any type of portable computing feature 126, or PDA 130. In some examples, one or more of the above-referenced functionality types may be combined and implemented using configurable multi-dimensional media device 102. In other examples, more, less, or different features beyond those described may be implemented and are not limited to the description provided. Further, various types of shapes may be used to implement configurable multi-dimensional media device 102, as described in greater detail below in connection with FIGS. 2A-2E and Exhibits A and B, which provide additional information regarding implementation, design, function, and structure of configurable multi-dimensional media device 102.

Figure 2A:
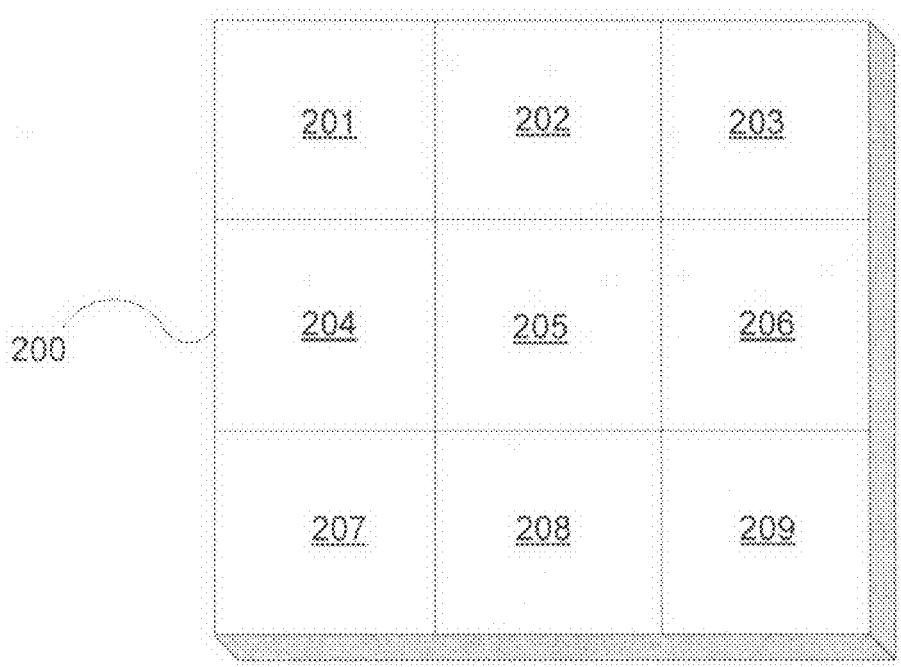
FIG. 2A illustrates an exemplary configurable multi-dimensional media device configured in a flat shape.
Figure 2B:
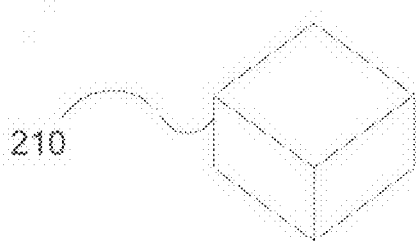
FIG. 2B illustrates an exemplary configurable multi-dimensional media device configured in a square shape.
Figure 2C:
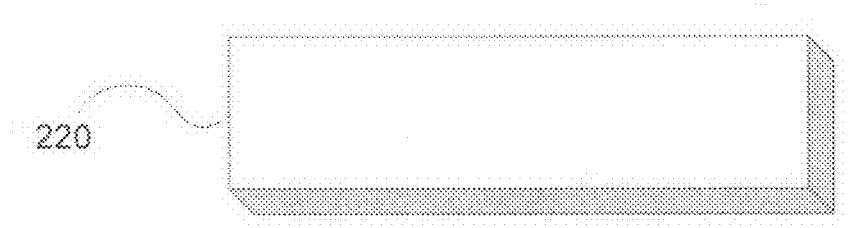
FIG. 2C illustrates an exemplary configurable multi-dimensional media device configured in an elongated shape.
Figure 2D:
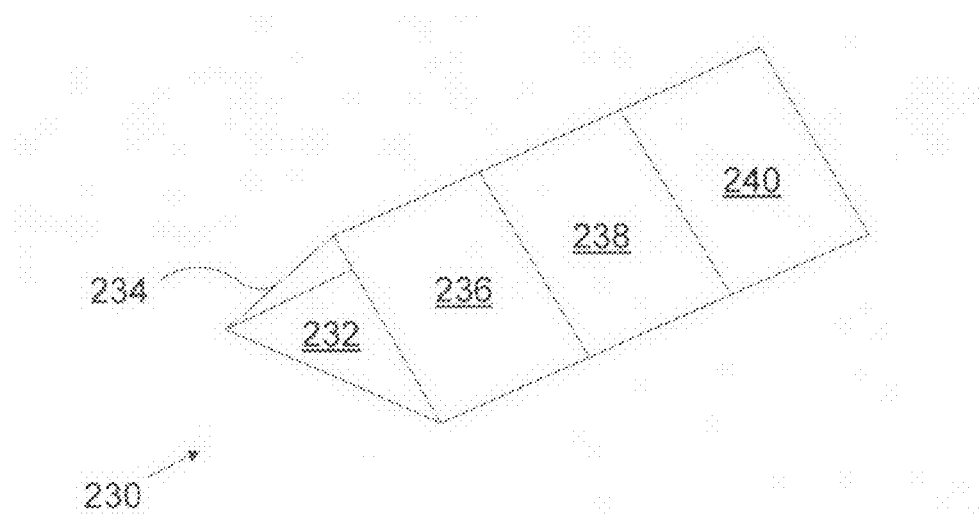
FIG. 2D illustrates an exemplary configurable multi-dimensional media device configured in a triangular shape.
Figure 2E:
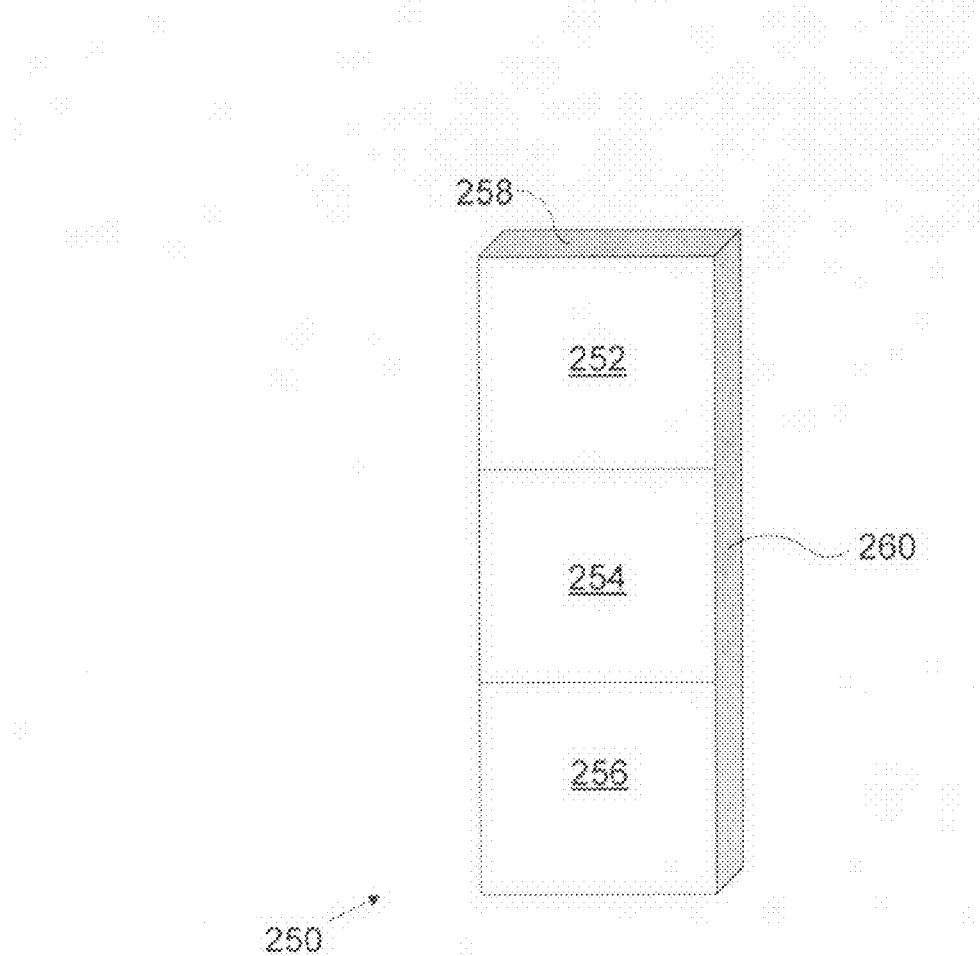
FIG. 2E illustrates an exemplary configurable multi-dimensional media device configured in an alternative elongated shape.

FIG. 2A illustrates an exemplary configurable multi-dimensional media device configured in a flat shape. Here, configurable multi-dimensional media device 200 may be implemented using segments 201-209. In some examples, each of segments 201-209 may include software, hardware, circuitry, firmware, or a combination thereof to implement functions such as those described above in connection with FIG. 1. In other examples, two or more of segments 201-209 may be coupled together to provide software, hardware, circuitry, firmware, or a combination thereof to provide the above-described features. Each of segments 201-209 may be implemented to provide various types of features. For example, one, some, or all of segments 201-209 may be implemented to provide thin, flexible displays for presenting information and data from one or more processors also implemented using segments 201-209. As another example, displays (not shown) implemented using segments 201-209 may be implemented as touch-sensitive displays to allow for user input. Further, displays or other interfaces implemented using segments 201-209 may be implemented using various types of organic, inorganic, or synthetic materials. Configurable multi-side mobile device 200 may be implemented using flexible coupling between segments 201-209, which allow for different shapes to be configured by manipulating segments 201-209.

For example, configurable multi-dimensional media device 200 may be configured into a square or substantially square shape, as shown. In other examples, configurable multi-dimensional media device 200 may be configured into a three-dimensional block such as shape 210 (FIG. 2B) that may be used as, for example, a scanner when placed over a paper, image, document, or other item. In other examples, configurable multi-dimensional media device 200 may be configured into a three-dimensional rectangle, as shown by shape 220 in FIG. 2C. Further, configurable multi-dimensional media device 200 may be configured into a three-dimensional triangular shape 230 (FIG. 2D), which may be configured by manipulating segments 232-240 to provide a base, back, and front. Still further, shape 250 (FIG. 2E) may be configured from segments 252-260. In other examples, different shapes and configurations may be implemented using segments (e.g., segments 201-209). The number (i.e., quantity), size, shape, and functionality implemented with each segment may be varied and is not limited to the examples shown and described. Further, the above-described illustrations are not drawn to scale and may be varied in dimension, scale, and other parameters. The above-described examples may be further varied in structure, shape, design, layout, circuitry, software, hardware, or any other aspect and are not limited to the examples provided.

Figure 3:
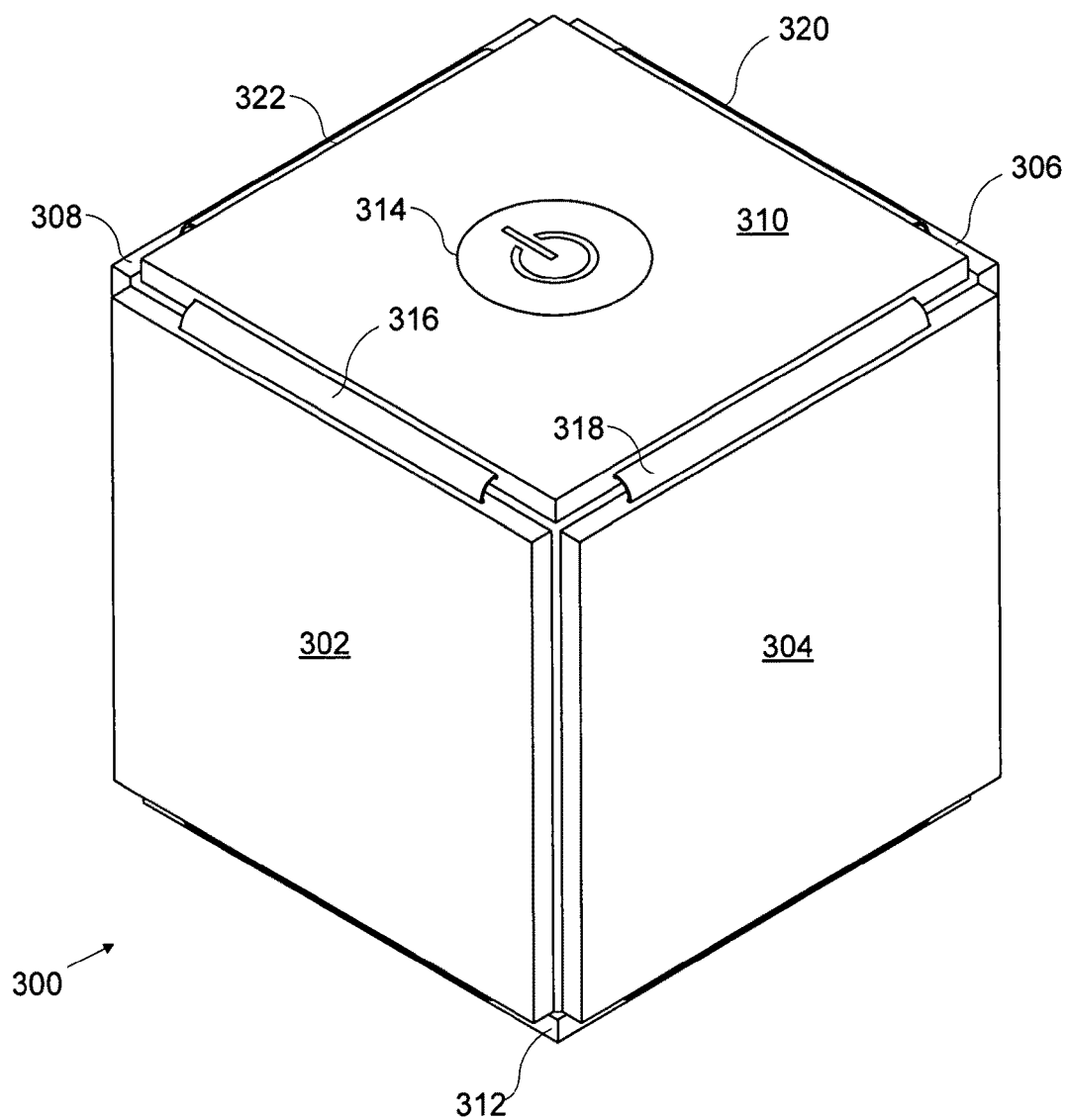
FIG. 3 illustrates an alternative view of an exemplary configurable multi-dimensional media device configured in a square shape.

FIG. 3 illustrates an alternative view of an exemplary configurable multi-dimensional media device configured in a square shape. Here, device 300 includes segments or panels (hereafter referred to as "panels") 302-312, power button 314, and couplings 316-322. In some examples, one or more panels are configured into a square shape and may be coupled together to form device 300 using couplings 316-322. Couplings 316-322 may, in some examples, be any type of flexible joint, hinge, articulating joint, or other material or mechanism used to couple panels 302-312 together. Further, panels 302-312 may be coupled on any edge using couplings 316-322.

Couplings 316-322 are not limited to any specific configuration, dimension, size, shape, or material. Here, panels 302-312 may be implemented with displays any type of display or rendering technology, including active matrix, thin-film transistors (TFT), organic or inorganic conductive materials, or any other type of system that is used to render an image on the surface of panels 302-312. Further, any type of circuitry, wiring, firmware, hardware, or software may be used to implement device 300.

In some examples, when power button 314 is depressed, electrical power (e.g., alternating current or direct current) may be enabled to various systems, features, and functions of device 300. For example, button 314 may be depressed to provide electrical current to panels 302-312 in order to display or render one or more images. Further, the configuration, orientation, or shape of device 300 may enable the display of images, text, or other data files or data ("data files") on panels 302-312 when power is supplied. In other examples, device 300 and the above-described elements may be implemented differently in quantity, composition, function, or configuration and are not limited to those shown and described.

Figure 4:
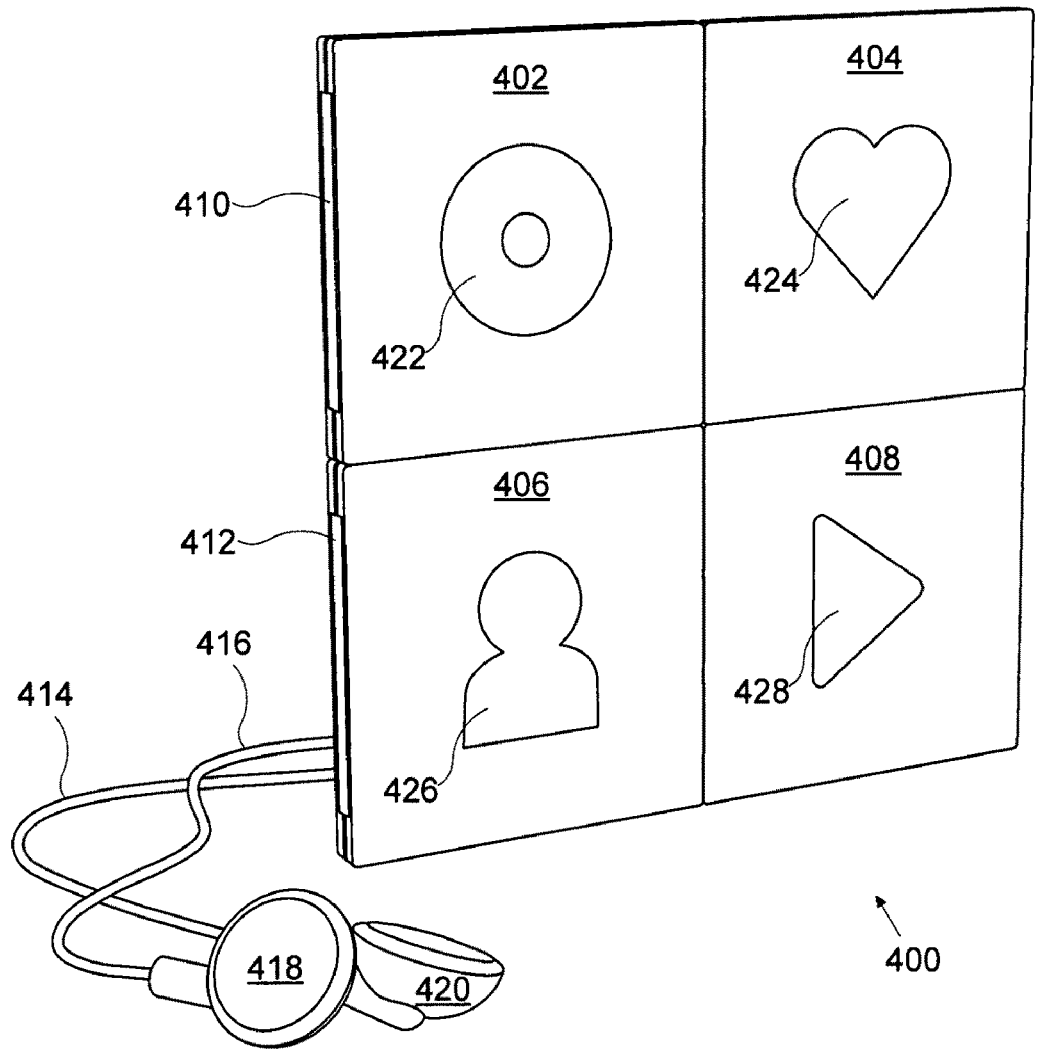
FIG. 4 illustrates an exemplary configurable multi-dimensional media device configured as a media player.

FIG. 4 illustrates an exemplary configurable multi-dimensional media device configured as a media player. Here, device 400 includes panels 402-408, hinges 410-412, ear plug wires 414-416, ear plugs 418-420, and icons 422-428. In some examples, when panels 402-408 are configured into the shape shown, a media player may be enabled. For example, panels 402-408 may be implemented using, for example, a touch screen or touch-sensitive display that allows the selection of icon 424 to present a list of favorites. In some examples, panels 402-408 may be used to present a single display and, when icon 424 is selected, a list of favorite album, song, picture, image, video, audio, or other files may be presented or displayed (i.e., as used herein, "presented" and "displayed" may be used interchangeably without distinction or differentiation in meaning). If a given file is selected and icon 428 is selected, then the selected file begins playing. If icon 422 is selected, then a file that is playing stops. Further, if icon 426 is selected, a playlist is presented on panels 402-408. Alternatively, any of icons 422-428 or different icons may be used to implement the above-described or different functions and are not limited to the examples shown and described. For example, if icon 422 is selected, an album may be presented.

In some examples, when images of files are presented on panels 402-408, different types of media may be presented. For example, an album cover, song list, video clip, photo, thumbnail, audio file may be presented on panels 402-408. Further, if media selected for playback in device 400, which may be described as a media player, and includes audio content, ear plugs 418-420 may be used to listen to the media being played back. In some examples, a coupling or connection (not shown) may be provided in device 400 to allow transmission and decoding of audio content. In other examples, wireless transmission media may also be provided using protocols such as Bluetooth, WiFi (i.e., "802.11x"), WiMax ("802.16x), and others. In other examples, device 400 and the above-described elements may be implemented differently in quantity, composition, function, or configuration and are not limited to those shown and described.

Figure 5A:
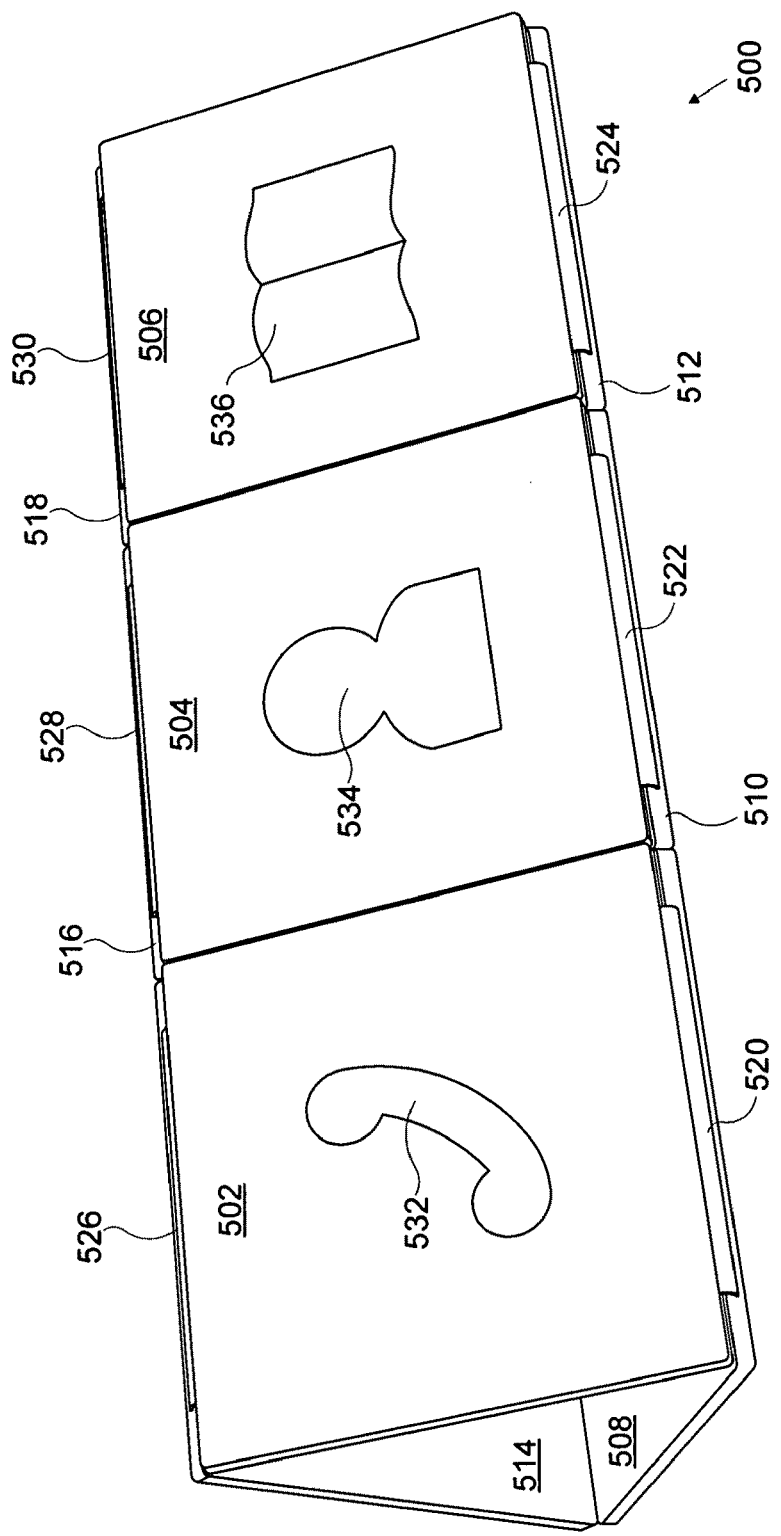
FIG. 5A illustrates an exemplary configurable multi-dimensional media device configured as a videoconferencing system.

FIG. 5A illustrates an exemplary configurable multi-dimensional media device configured as a videoconferencing system. In some examples, device 500 includes panels 502-518, couplings 520-530, and icons 532-536. Here, device 500 may be configured in a triangular format and used to create and manage a video conference with one or more other callers. As described above, device 500 may be configured using panels 502-528, which may be directly or indirectly coupled together using, for example, couplings 520-530. In other examples, more, fewer, or different types of couplings may be used and are not limited to those shown and described. For example, device 500 and the described elements may be formed using various materials including, metal, metal alloy, composite, plastic, and other inorganic, synthetic, or organic materials. Device 500 may include various types of hardware, software, firmware, circuitry, logic, and the like to implement the described video conferencing features. As an example, when device 500 is configured, icons 532-536 are presented on panels 502-506 that are presented to a user.

In some examples, if icon 532 is selected, a call may be made to initiate, for example, a video conference with another caller. If icon 534 is selected, a list of bookmarked, favorite, or often-called users may be listed on one or more of panels 502-506. When icon 536 is selected, a list of callers is presented to the user. In other examples, device 500 and the above-described elements may be implemented differently in quantity, composition, function, or configuration and are not limited to those shown and described.

Figure 5B:
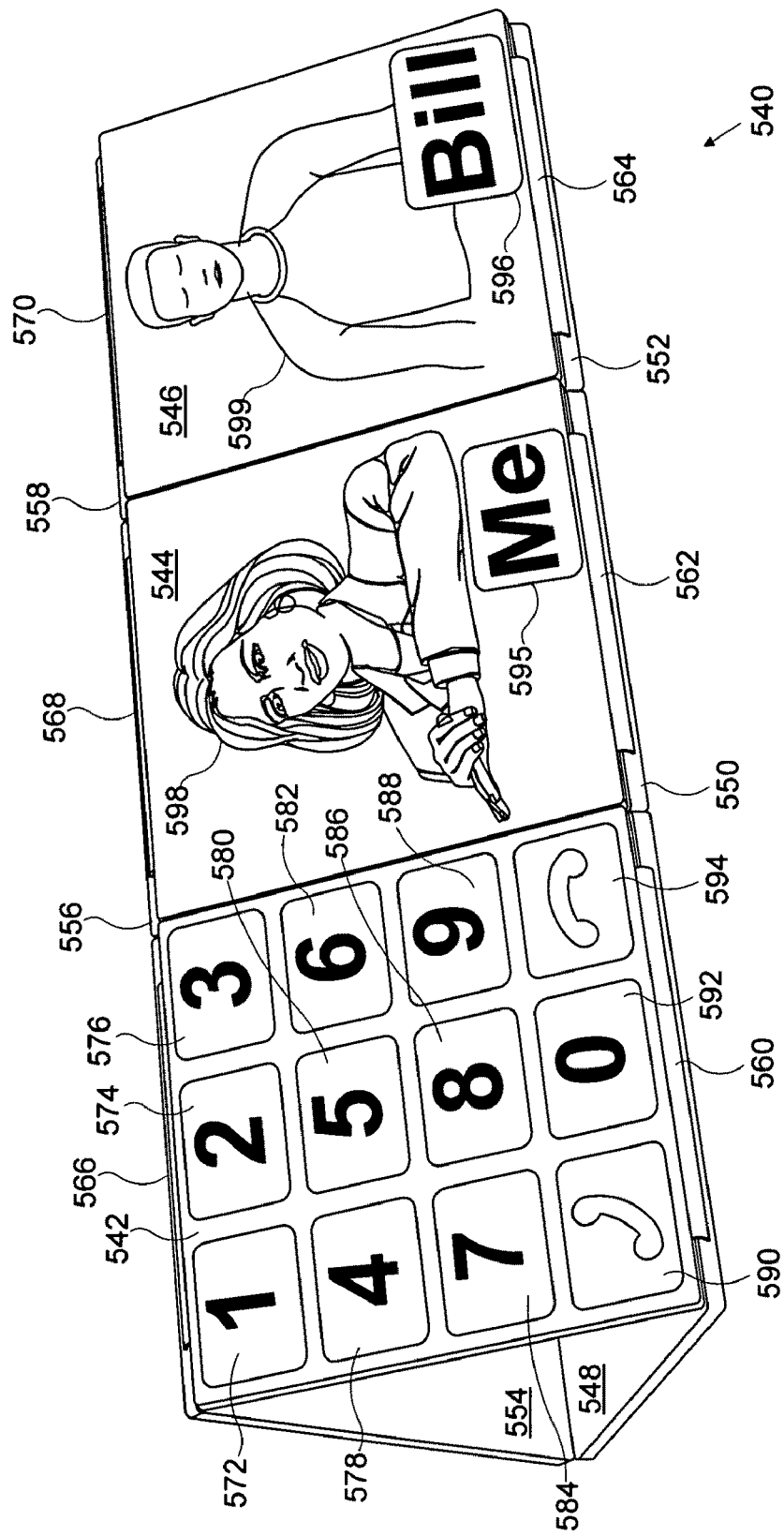
FIG. 5B illustrates an alternative view of an exemplary configurable multi-dimensional media device configured as a videoconferencing system.

FIG. 5B illustrates an alternative view of an exemplary configurable multi-dimensional media device configured as a videoconferencing system. Here, device 540 includes panels 542-558, couplings 560-570, buttons 572-594, windows 595-596, and images 598-599. In some examples, if a video conference or call are initiated by selecting icon 532 (FIG. 5A), buttons 572-594 are presented on panel 542. When a call is initiated and "connected" (i.e., a data communication channel, tunnel, or other connection is made between two or more endpoints (e.g., device 540, telephones, videoconferencing telephones, and the like), images 598-599 representing the calling user and the receiving user are shown in panels 544-546, respectively. In other examples, a camera mounted or house within any of panels 542-558 may be provided and used to capture a real-time video image of a calling user that may be presented in panel 544. Further, when callers are presented in any of panels 544-546, windows 595-596 may be presented and the identification of a given caller may be displayed. As an example, subscriber information for a given caller may be obtained from a cellular or mobile network operator. Using data header information associated with, for example, a subscriber identification (SID), the identification, telephone number, or other information may be presented in windows 595-596. Still further, device 540 and the above-described elements may be implemented differently with regard to quantity, composition, function, or configuration and is not limited to those shown and described.

Figure 6A:
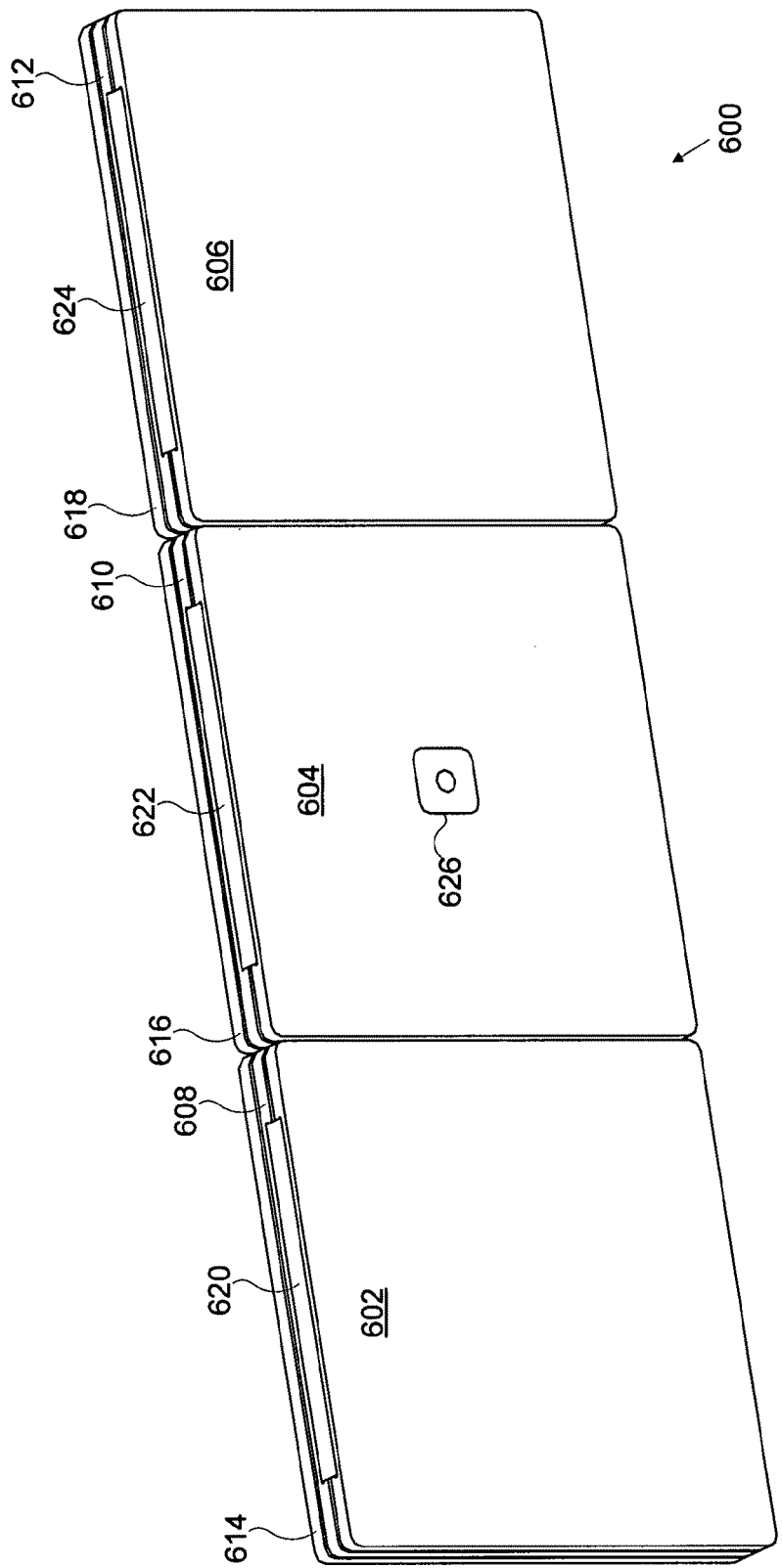
FIG. 6A illustrates an exemplary configurable multi-dimensional media device configured as a camera.

FIG. 6A illustrates an exemplary configurable multi-dimensional media device configured as a camera. Here, device 600 includes panels 602-618, couplings 620-624, and camera aperture 626. In some examples, device 600 may be configured to implement a camera function, which may be further implemented using various types of hardware, software, firmware, circuitry, logic, or the like. Types of image capture devices may be varied (e.g., charge coupling devices (CCD), and others) and are not limited to the examples shown.

Here, when device 600 is configured into the shape shown, a camera function may be enabled, allowing the capture of video and still images. Further, a microphone (not shown) may be provided and used to capture audio associated with the video and still images. In other examples, device 600 and the above-described elements may be implemented differently with regard to quantity, composition, function, or configuration and is not limited to those shown and described.

Figure 6B:
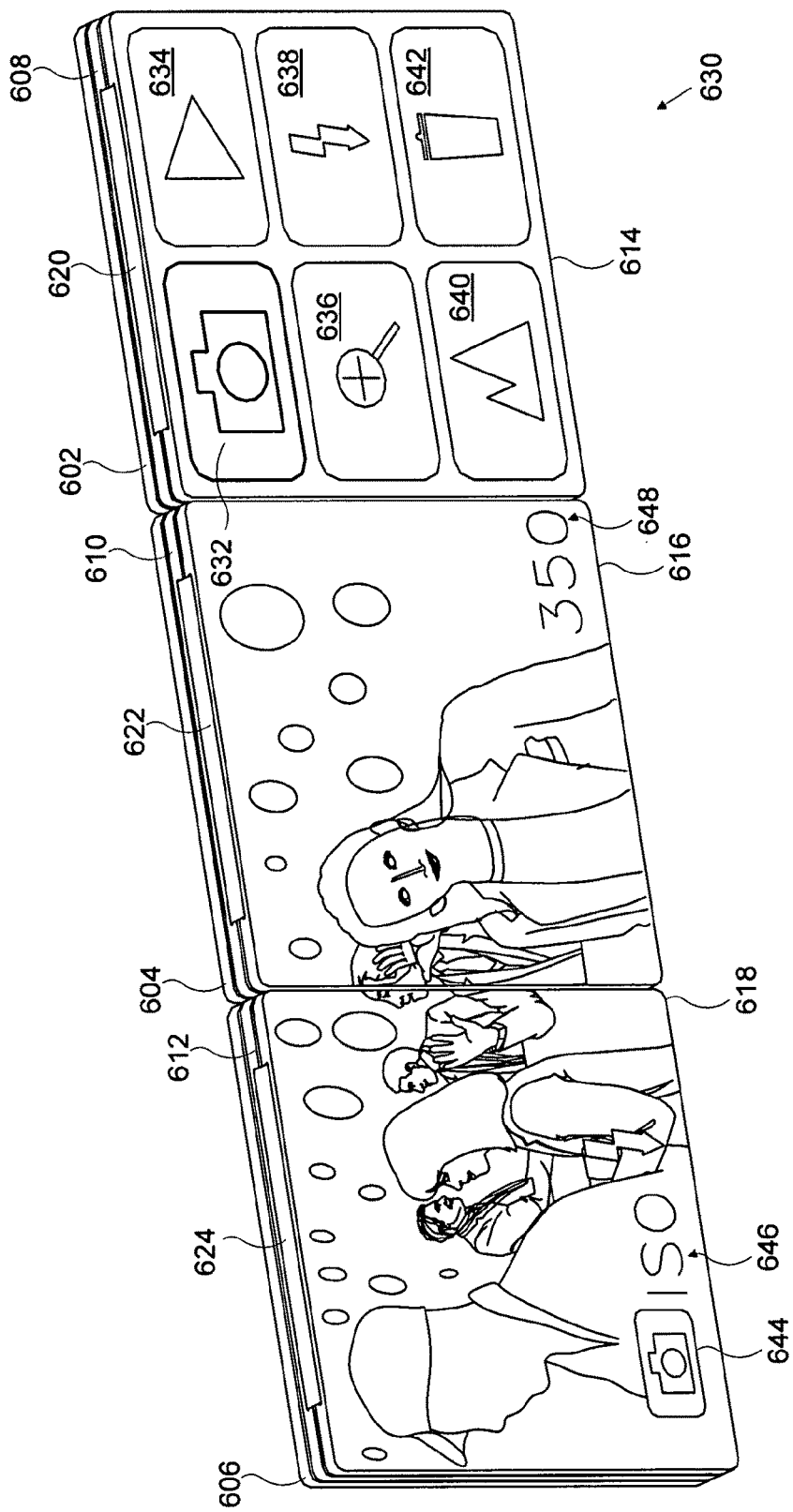
FIG. 6B illustrates an alternative view of an exemplary configurable multi-dimensional media device configured as a camera.

FIG. 6B illustrates an alternative view of an exemplary configurable multi-dimensional media device configured as a camera. Here, device 630 includes panels 602-618, couplings 620-624, buttons 632-642, and symbols 644-648. In some examples, the view shown may be the opposite side of device 600 (FIG. 6A). When camera aperture 626 is directed towards a given view in anticipation of capturing (i.e., recording) a video or still image, the video or still image may be presented on, for example, panels 616-618. A preview of an image or a video clip may be previewed on panels 616-618. In other examples, panels 602-618 may be touch-screen enabled or touch-sensitive and, when an image is viewed, the image may be displayed across three, one or more of panels 602-618. Still further, when an image is presented (i.e., "displayed"), symbols indicating various status, conditions, or other parameters associated with the image may be presented using symbols 644-648. Further, buttons 632-642 may be used to allow various actions associated with device 630.

For example, button 632 may be used to capture an image. Button 634 may be used to play, for example, a recorded video, audio clip, or series of still images. Button 636 may be used to zoom in (or out) of a given view. Button 638 may be used to turn a flash bulb, light emitting diode, or other type of light used to enhance the capture of a video or still image. Further, button 640 may be used to implement various features associated with taking, for example, an outdoor or perspective picture. Still further, button 642 may be used to discard a given video, audio clip, still image, or other file. In other examples, more, fewer, or different buttons may be provided on any of panels 602-618 and are not limited those shown and described. In other examples, device 630 and the above-described elements may be implemented differently with regard to quantity, composition, function, or configuration and is not limited to those shown and described.

Figure 7A:
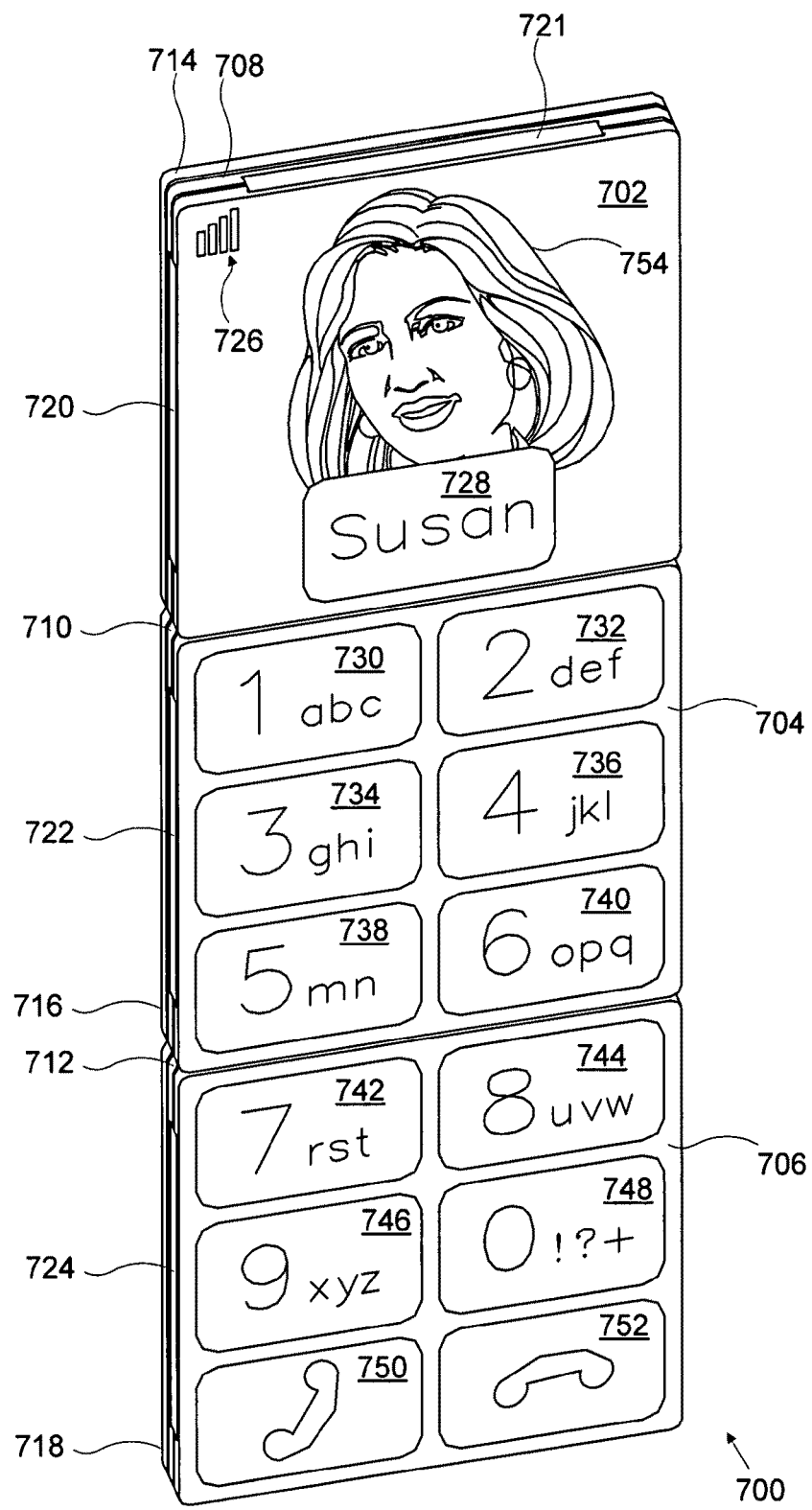
FIG. 7A illustrates an exemplary configurable multi-dimensional media device configured as a mobile communication system.

FIG. 7A illustrates an exemplary configurable multi-dimensional media device configured as a mobile communication system. Here, device 700 includes panels 702-718, couplings 720-724, signal strength indicator 726, window 728, buttons 730-752, and image 754. In some examples, when device 700 is configured (i.e., by configuring panels 702-718 into the shape shown), cellular or mobile phone functionality is presented in panels 702-718, including a dial pad consisting of, among others, buttons 730-752. When a call is initiated, a caller's image (e.g., image 754) and window 728 displaying, for example, a text description of a caller's ID may be presented. Further, signal strength indicator 726 may be displayed on any of panels 702-718 to indicate the strength of a given wireless signal used over, for example, a wireless communication network such as a mobile phone system or cell network. In other examples, device 700 and the above-described elements may be implemented differently with regard to quantity, composition, function, or configuration and is not limited to those shown and described.

Figure 7B:
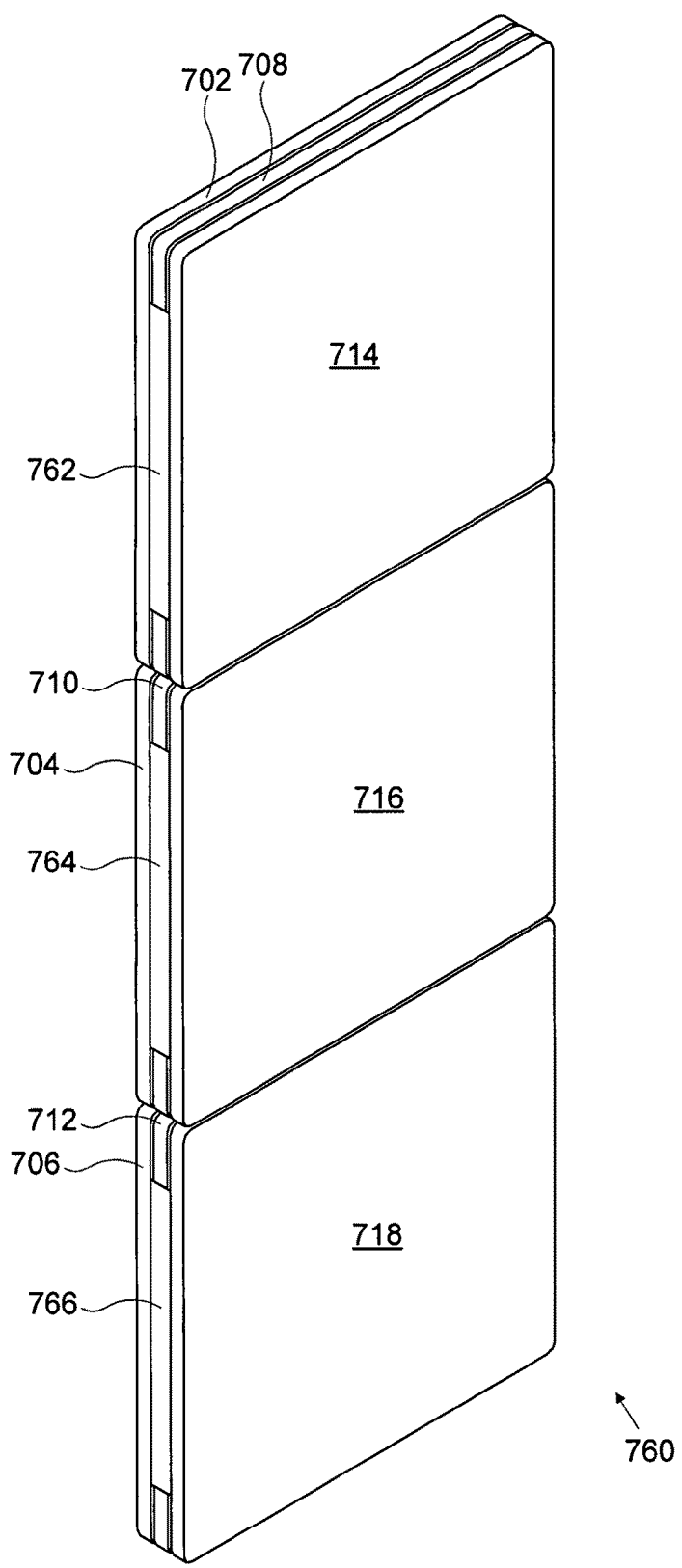
FIG. 7B illustrates an alternative view of an exemplary configurable multi-dimensional media device configured as a mobile communication system.

FIG. 7B illustrates an alternative view of an exemplary configurable multi-dimensional media device configured as a mobile communication system. Here, device 760 includes panels 702-718 and couplings 762-766. As an alternative (e.g., rear perspective) view of device 700, panels 702-718 may be configured into the shape shown. In other examples, the number of panels 702-718 and couplings 762-766 may be varied and are not limited to the examples shown. For example, couplings 762-766 may be varied and are not limited to the number, sizes, shapes, or positions shown. Couplings 762-766 may be adhesive, contact, magnetic, or use other types of connective materials and mechanisms in order to configure panels 702-718 into the shapes described herein. Further, panels 702-718 may have integrated power sources that distribute electrical current across couplings 762-766. In some examples, couplings 762-766 may include circuitry or other conductive ribboning or materials that enable electrical current to flow between panels 702-718. In other examples, when panels 702-718 are configured into various shapes, electrical male and female contacts (not show) may also be mounted, placed, or otherwise formed on the surfaces of panels 702-718 that, when in contact with each other, allow for electrical current to flow to various components (e.g., displays, processors, resistors, transistors, microprocessors, and others). In still other examples, the number of panels and couplings may be varied and are not limited to the implementations shown and described. As an example, couplings 762-766 may be varied in quantity. Couplings 762-766 may also be varied by placement or position. For example, couplings 762-766 may be used to couple panels 702-718 from the right, left, top, bottom, or a combination thereof. In other examples, device 760 and the above-described elements may be implemented differently with regard to quantity, composition, function, or configuration and is not limited to those shown and described.

Figure 8:
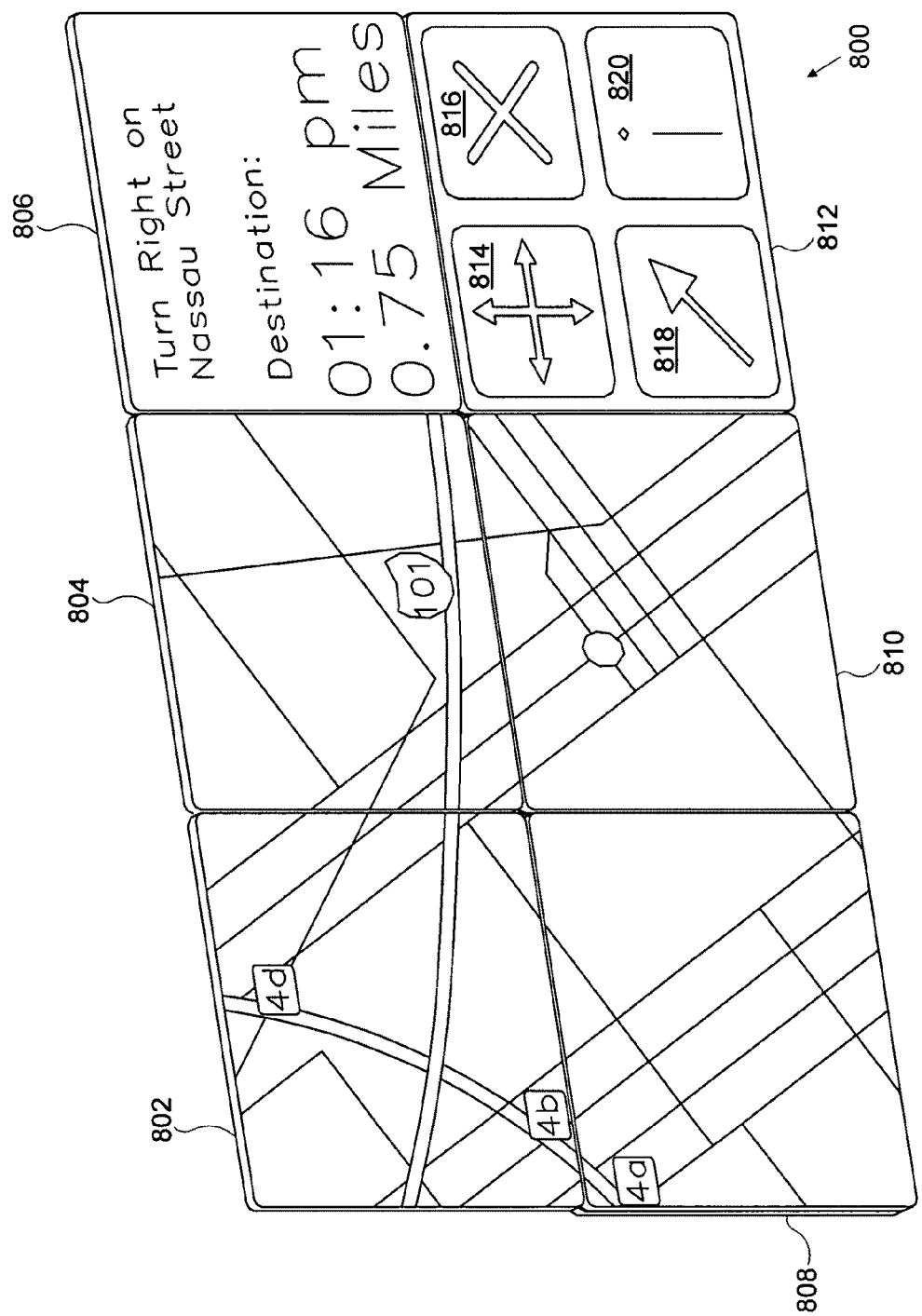
FIG. 8 illustrates an exemplary configurable multi-dimensional media device configured as a mapping system.

FIG. 8 illustrates an exemplary configurable multi-dimensional media device configured as a mapping system. Here, device 800 includes panels 802-812 and buttons 814-820. In some examples, panels 802-812 may be configured in a flat shape that allows the display of a map, chart, or other geographical visual representation. A map may be displayed, for example, on panels 802-804 and 808-810. On panel 806, directions associated with the map displayed on panels 802-804 and 808-810 may be presented. Buttons 814-820 may be presented on panel 812 that provide various options to a user. For example, button 814 may be selected using, for example, a touch-sensitive screen (i.e., "touch screen") to adjust the view of the map presented on panels 802-804 and 808-810. Button 816 may be used to stop the downloading of, for example, a map or directions into panels 802-810. Likewise, button 818 may be used to move the map in given direction, zoom, or otherwise adjust the information (e.g., map or directions) displayed on panels 802-810. Further, button 820 may be used to request information associated with a given map, address, or the like. Buttons 814-820 may be varied in shape, appearance, quantity, size, function, layout, design, or other aspects and are not limited to the examples shown. As an example, if a user has an address presented and presses, for example, button 820, information including various categories of businesses, points of interest, government agencies (e.g., post offices, police stations, bus stations, and others) may be presented in any of panels 802-810. Various techniques for presenting information on panels 802-812 may be used and are not intended to be a limitation on the use of device 800 as a mapping system that, for example, may provide maps from pre-loaded or downloaded software or receiving a signal from a constellation of geospatial and positioning satellites such as the Global Positioning System ("GPS"). In other examples, device 800 and the above-described elements may be implemented differently with regard to quantity, composition, function, or configuration and is not limited to those shown and described.

Figure 9:
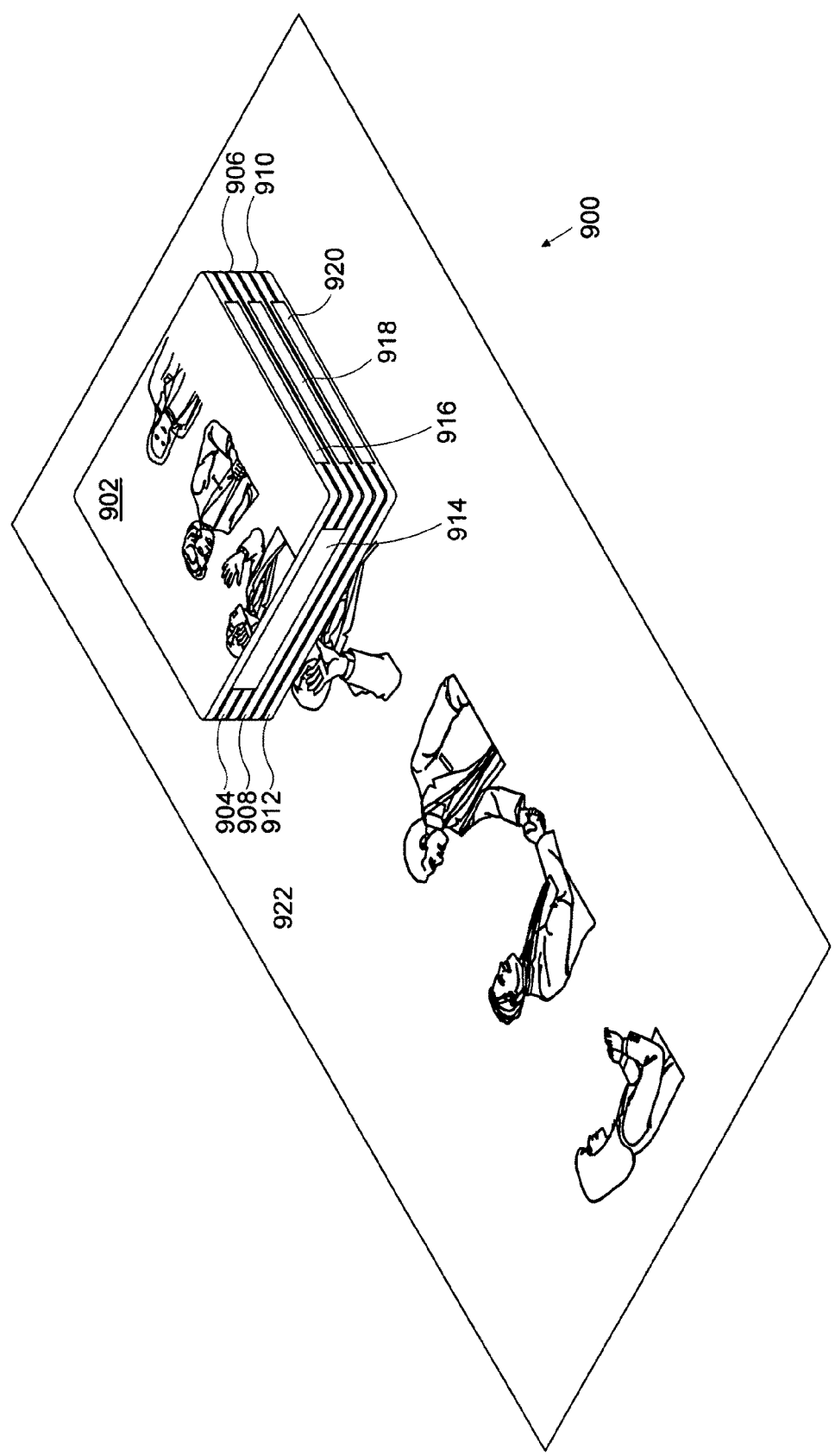
FIG. 9 illustrates an exemplary configurable multi-dimensional media device configured as a digital image scanner.

FIG. 9 illustrates an exemplary configurable multi-dimensional media device configured as a digital image scanner. Here, device 900 includes panels 902-912 and couplings 914-920, the latter of which may be used to configure panels 902-912 as a "stack" providing a digital scanning function. As an example, when panels 902-912 are coupled together in a stack using couplings 914-920, an image viewed, recognized, or otherwise scanned (i.e., using various scanning techniques, such as imaging, optical character recognition ("OCR"), and others) from a bottom panel (i.e., panel 912) may be used to generate a digital image that is shown on a top panel (i.e., panel 902). While an image of document 922 is being scanned, the image scanned by panel 912 is presented on panel 902 and stored within a memory housed within one or more of panels 902-912. Further, images may be downloaded, uploaded, or otherwise sent or received from device 900 by a communications module, function, or system (not shown) that is in data communication with another computer, processor, server, or other computing device. Still further, device 900 and the above-described elements may be implemented differently with regard to quantity, composition, function, or configuration and is not limited to those shown and described.

Figure 10A:
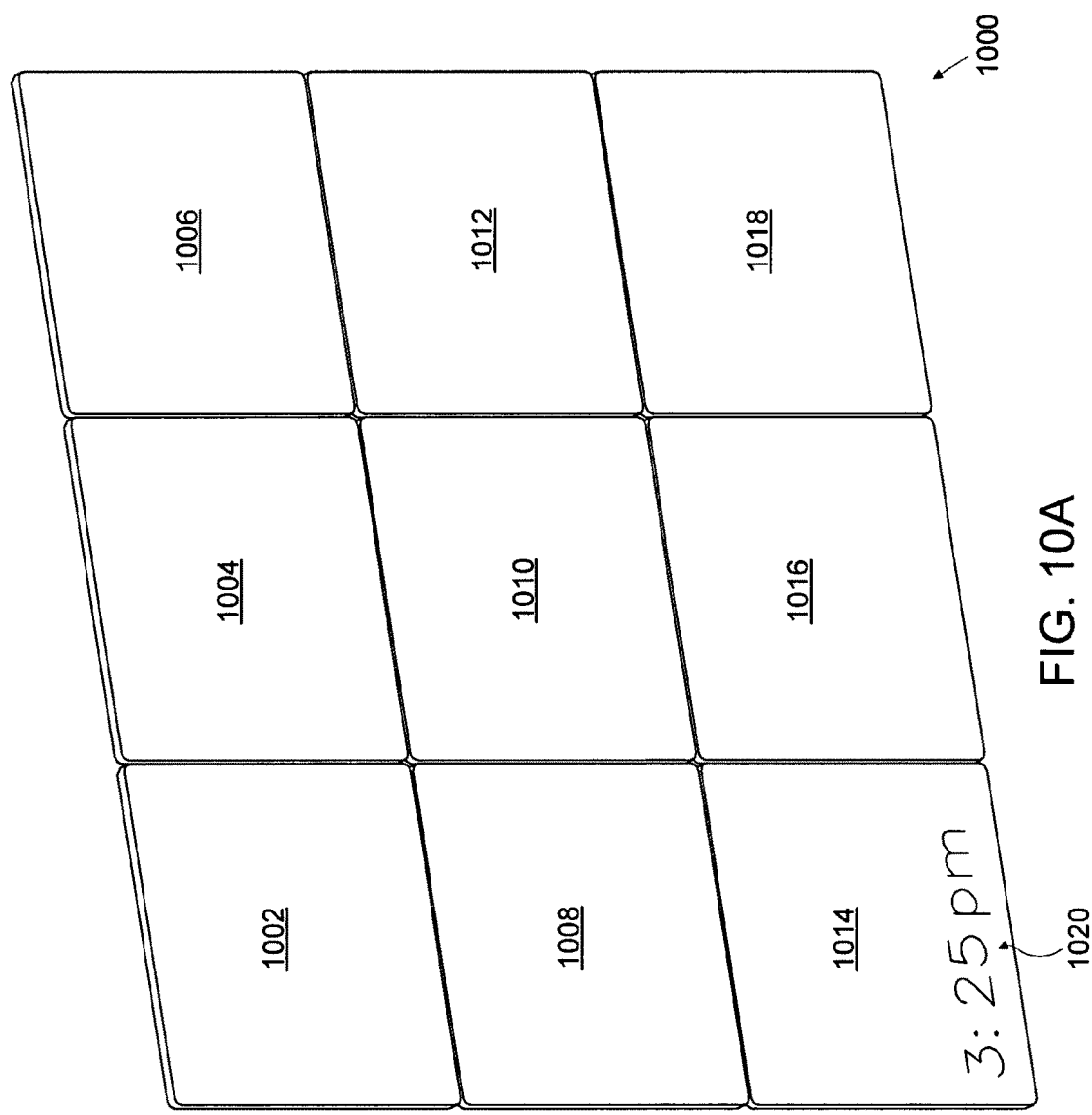
FIG. 10A illustrates an exemplary configurable multi-dimensional media device configured as an image capturing system.

FIG. 10A illustrates an exemplary configurable multi-dimensional media device configured as an image capturing system. Here, device 1000 includes panels 1002-1018 and time display 1020. In some examples, panels 1002-1018 may be displayed as a flat panel display configured to present an image, video, or multi-media content. In some examples, a flat panel display may refer to the configuration of panels 1002-1018 into a flat shape, as shown, and used to implement digital rendering techniques for presenting images, video, or other multi-media content. Examples of techniques that may be used are liquid crystal displays ("LCD"), thin-film transistor (TFT), active matrix TFT, and others. Any type of techniques or implementations of hardware, software, firmware, circuitry, or a combination thereof may be used to implement display capabilities for device 1000. In other examples, time display 1020 may be omitted. In still other examples, other information may also be displayed (e.g., time and date, name, number of image, file name, and others). In still other examples, device 1000 and the above-described elements may be implemented differently with regard to quantity, composition, function, or configuration and is not limited to those shown and described.

Figure 10B:
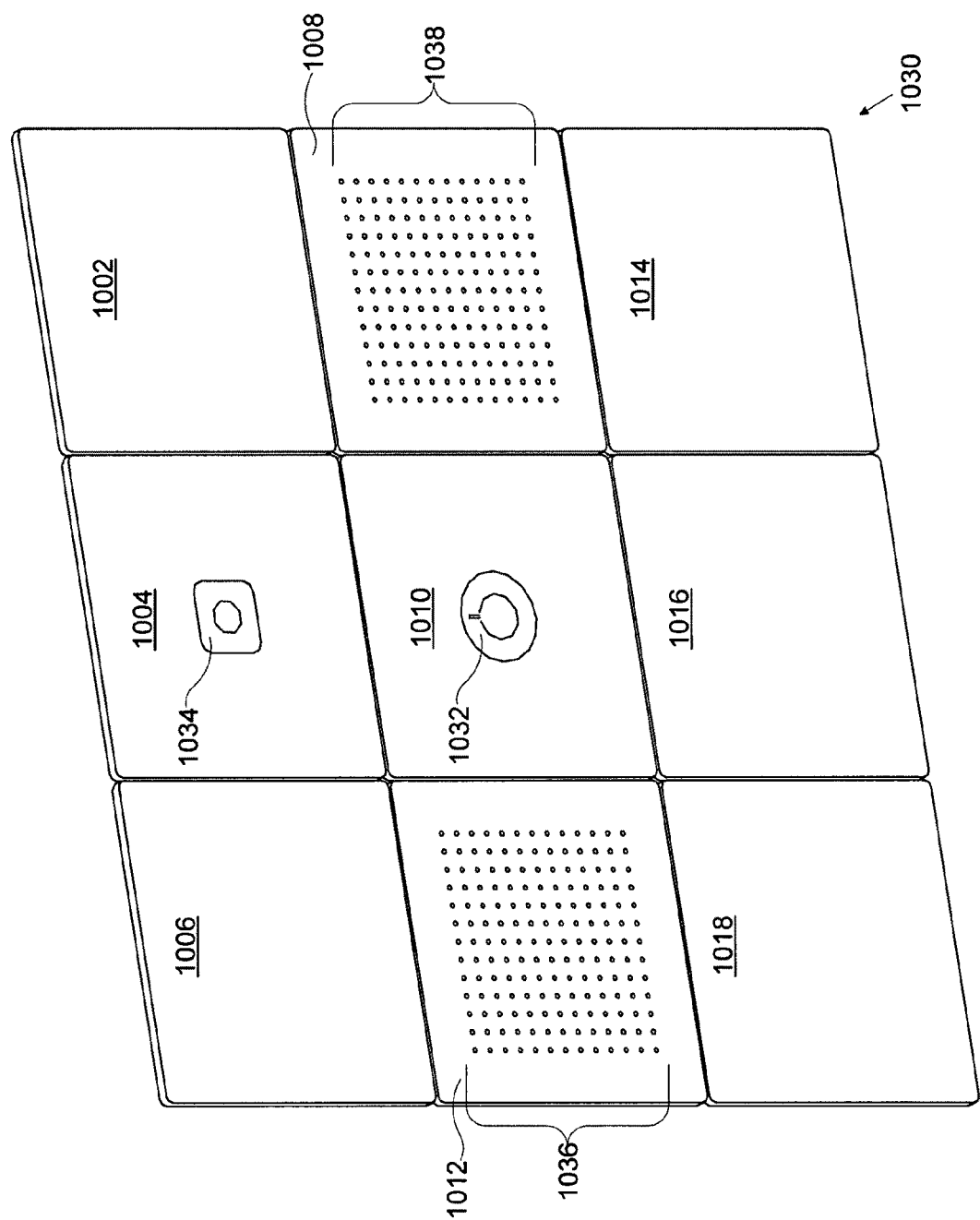
FIG. 10B illustrates an alternative view of an exemplary configurable multi-dimensional media device configured as an image capturing system.

FIG. 10B illustrates an alternative view of an exemplary configurable multi-dimensional media device configured as an image capturing system. Here, device 1030 includes panels 1002-1018, power button 1032, image capture aperture 1034, and speakers 1036-1038. In some examples, the view shown may be a rear view of device 1000 (FIG. 10A). As an example, a still image or moving image or picture may be captured using image capture aperture 1034 and displayed on the front of panels 1002-1018. Alternatively, image capture aperture 1034 may be positioned differently, for example, on the front of panels 1002-1018 and used as a mirror (i.e., capture an image of the user). Further, power button 1032 may be used to turn device 1000 on or off. When power is supplied, an image may be captured, encoded, and rendered on panels 1002-1018, which may be configured to display a multi-dimensional (i.e., multiple paneled) image. Power may be stored in an internal battery (not shown) or using an external power source (not shown). Still further, the described techniques herein may be used without regard to any specific type or implementation of power sources including, without limitation, disposable battery, rechargeable batteries, external power couplings, cables, or docks, and others. Power (e.g., electrical current) may be provided in either alternative or direct current (i.e., AC or DC) at any frequency that may be used to implement functions and features such as those described herein. Further, processor and memory implementations may use various techniques, including semiconductor materials, liquid, spherical, or other conductive or semi-conductive materials. In other examples, device 1030 and the above-described elements may be implemented differently with regard to quantity, composition, function, or configuration and is not limited to those shown and described.

Figure 11:
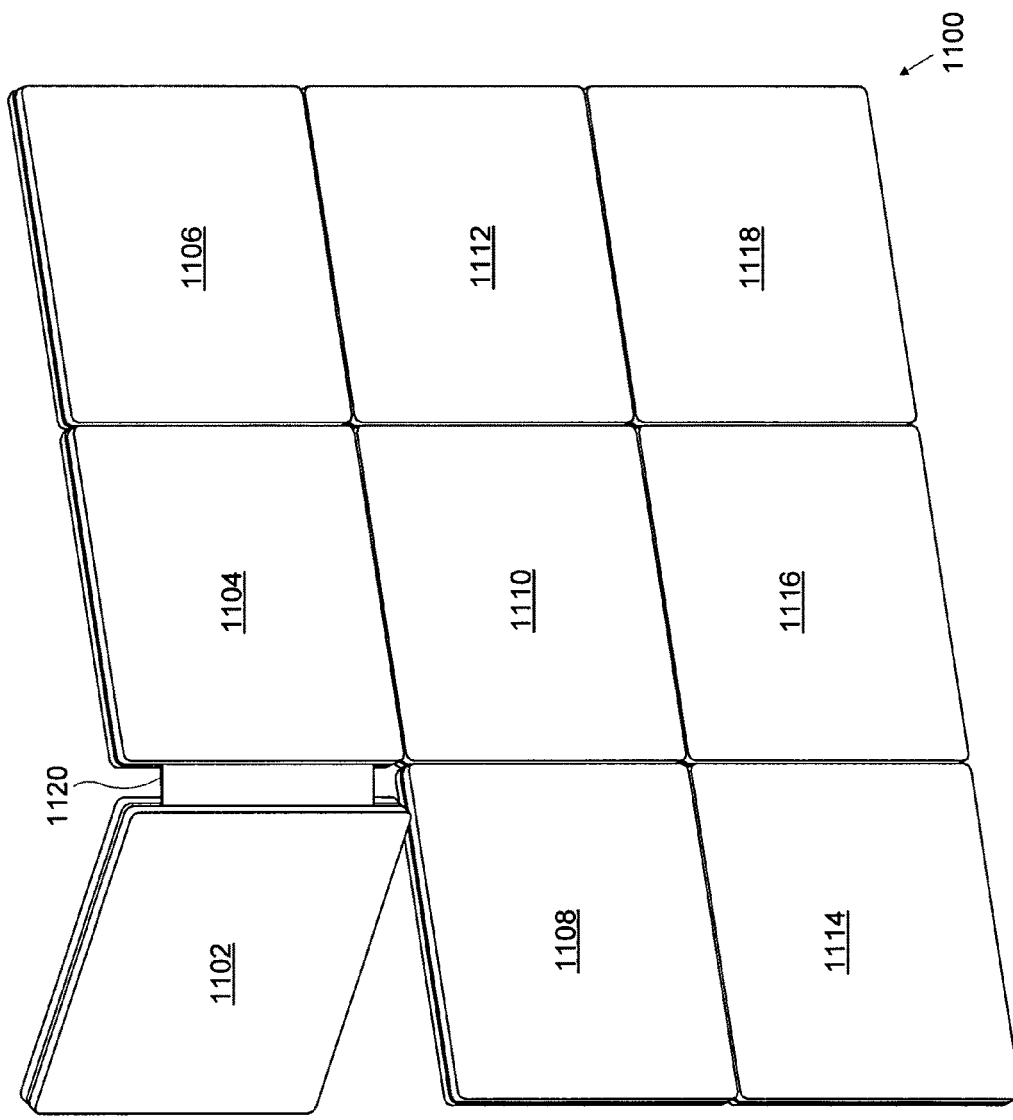
FIG. 11 illustrates an exemplary structure of a configurable multi-dimensional media device.

FIG. 11 illustrates an exemplary structure of a configurable multi-dimensional media device. Here, device 1100 includes panels 1102-1118 and coupling 1120. Here, panel 1102 is shown in a position "bent" or angled away from the plane composed of panels 1104-1118. Although panel 1102 is angled away from panels 1104-1118, mechanical and electrical connections are maintained by coupling 1120, which may be a mechanical, electrical, electronic, electromechanical, or other type of connection. In some examples, panel 1102 may also include internal components that are used to implement the various features and functions that are described herein, including being configured as a media player, mobile or cellular phone, videoconferencing unit, game console or handset, mirror, camera, image recording device, or others without limitation. As a configurable device, panels 1102-1118 may be manipulated into various shapes, each of which may have an associated function, such as those described herein. In other examples, device 1100 and the above-described elements may be implemented differently with regard to quantity, composition, function, or configuration and is not limited to those shown and described.

Figure 12:
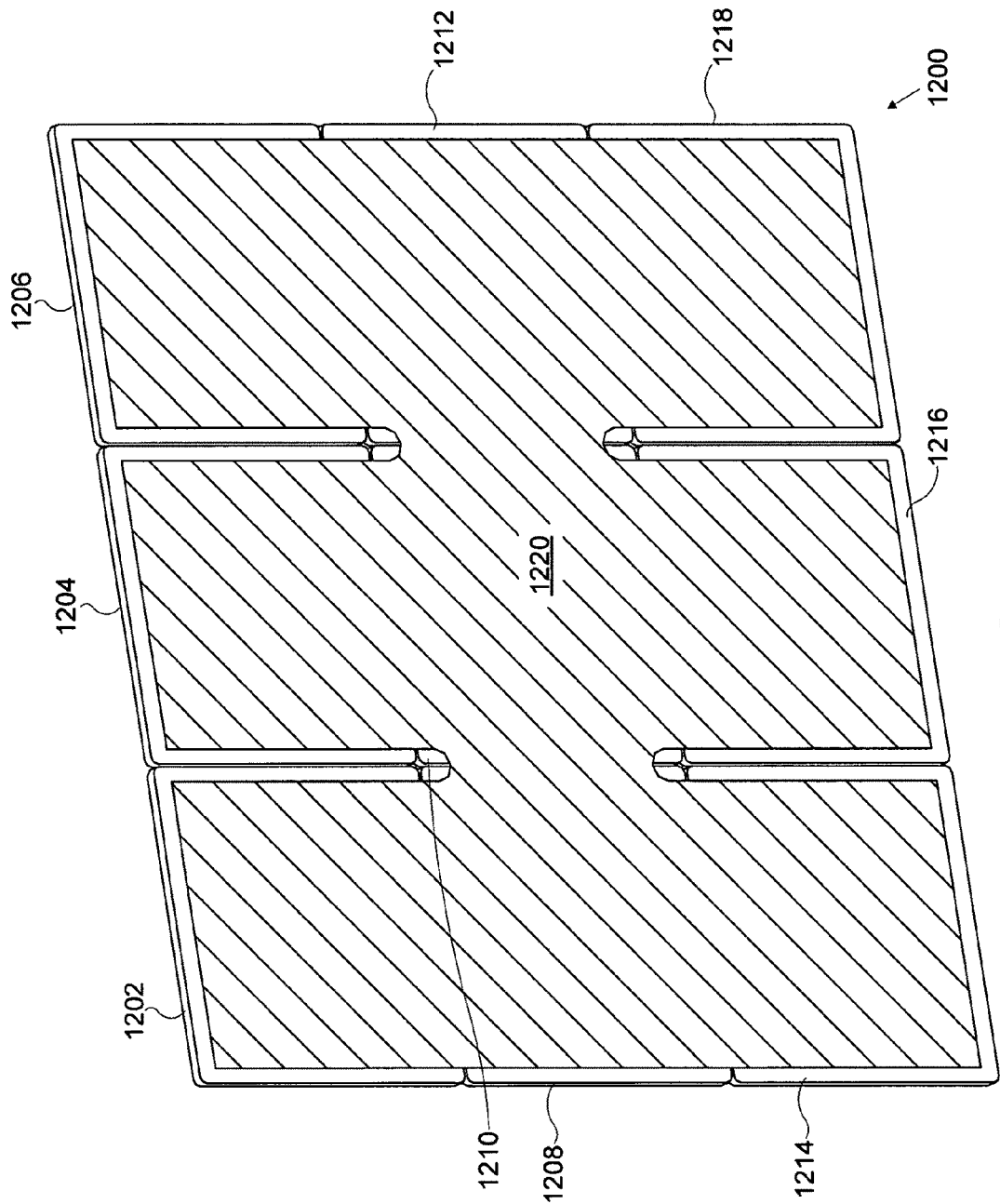
FIG. 12 illustrates an alternative view of an exemplary structure of a configurable multi-dimensional media device.

FIG. 12 illustrates an alternative view of an exemplary structure of a configurable multi-dimensional media device. Here, an internal view of device 1200 is shown, including panels 1202-1218 and conductive membrane 1220. In some examples, panels 1202-128 may include an intermediately-disposed electrically conductive membrane that is used to carry electrical signals between components used in device 1200. Various components (e.g., semiconductors, memory chips, processor chips and systems, printed circuit boards, and the like) may be embedded, formed, integrated, included, or otherwise implemented with panels 1202-1218, passing electrical signals and current across electrically conductive membrane 1220. In other examples, device 1200 and the above-described elements may be implemented differently with regard to quantity, composition, function, or configuration and is not limited to those shown and described.

Figure 13:
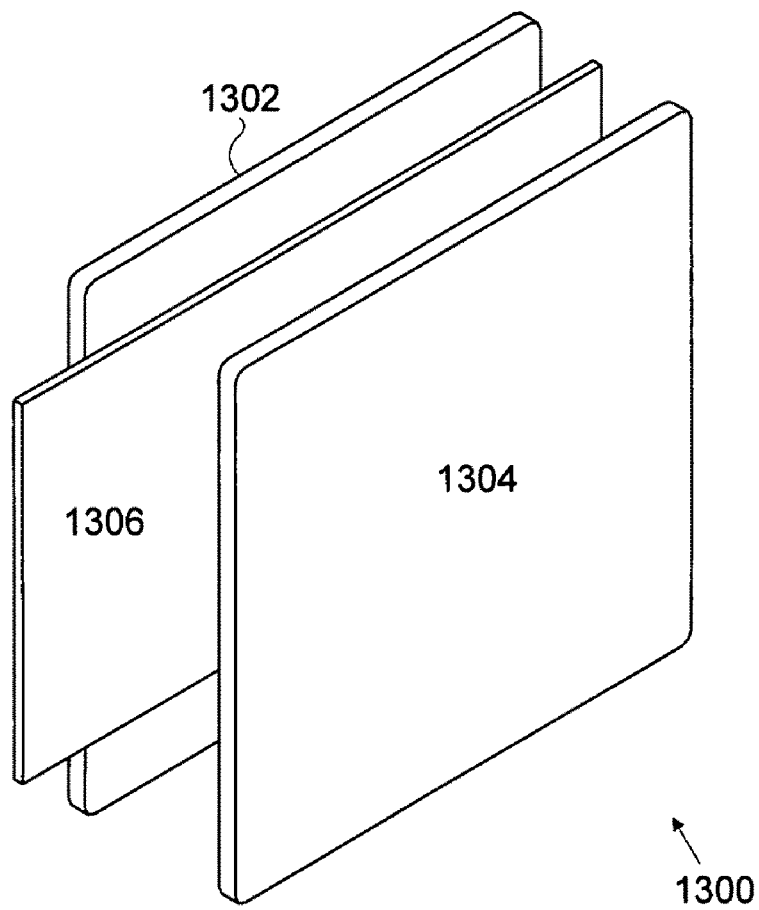
FIG. 13 illustrates an exemplary structure of a configurable multi-dimensional media device panel.
Figure 14A:
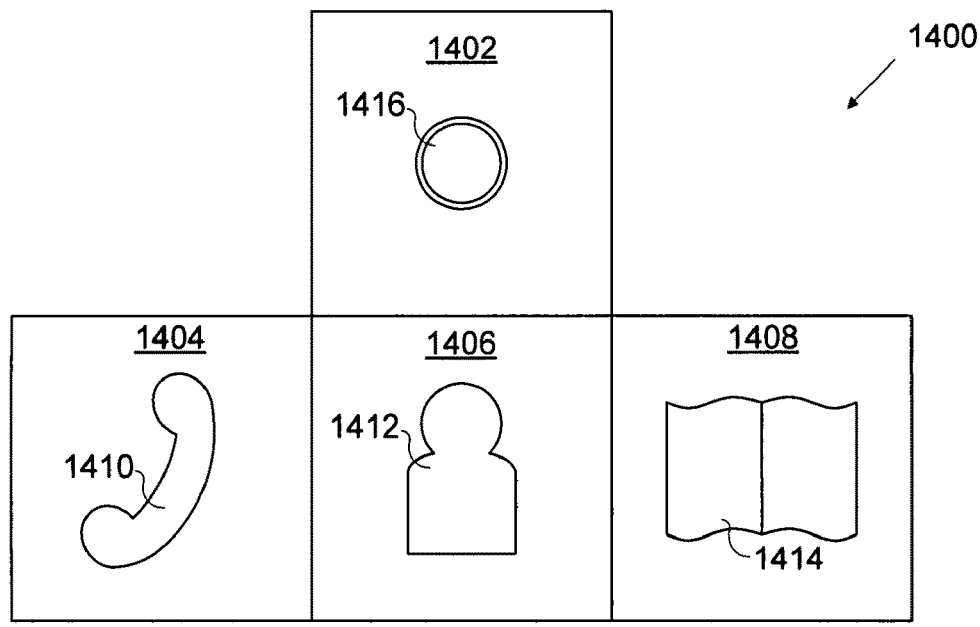
FIG. 14A illustrates an exemplary configurable multi-dimensional media device configured as a video communications system.

FIG. 13 illustrates an exemplary structure of a configurable multi-dimensional media device panel. Here, panel 1300 may be composed of sides 1302-1304 and filament 1306. In some examples, sides 1302-1304 may be configured to present images, text, or other single or multi-media content externally. Electrical signals may be passed using various types of conductive materials, such as those described above (e.g., electrically conductive membrane 1220 (FIG. 12)) or filament 1306, wires (not shown), printed or fabricated circuitry (not shown), or others. In other examples, panel 1300 and the above-described elements may be implemented differently with regard to quantity, composition, function, or configuration and is not limited to those shown and described.

FIG. 14A illustrates an exemplary configurable multi-dimensional media device configured as a video communications system. Here, device 1400 includes panels 1402-1408, icons 1410-1414, and image capture aperture 1416. In some examples, device 1400 device 1400 may be used to make voice and video calls to other users. When device 1400 is configured as shown, icons 1410-1414 appear on panels 1404-1408. Icon 1404 may be used to initiate a call to a user selected, from example, a pre-set list (e.g., favorites, frequently called, and others) of users selected using icon 1412. Calls may also be initiated from an address book that appears (not shown) when icon 1414 is selected. In other examples, different options may be presented by displaying more, fewer, or different icons other than those shown. Examples of different options may include, initiating a call to multiple users, placing a call on hold, viewing caller identification and other associated information, and others. Still further, when a video call is made, images may be captured in aperture 1416 and encoded and transmitted to other endpoints (i.e., devices that may or may not be substantially similar to device 1400). In other examples, device 1400 and the above-described elements may be implemented differently with regard to quantity, composition, function, or configuration and is not limited to those shown and described.

Figure 14B:
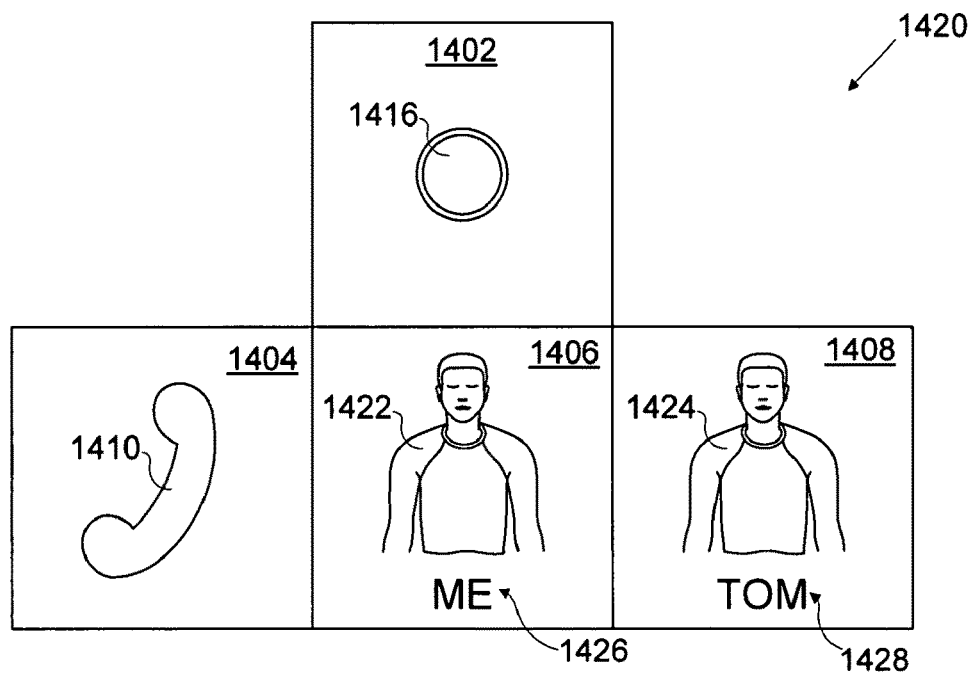
FIG. 14B illustrates an alternative exemplary configurable multi-dimensional media device configured as a video communications system.

FIG. 14B illustrates an alternative exemplary configurable multi-dimensional media device configured as a camera. Here, device 1420 includes panels 1402-1408, icon 1410, image capture aperture 1416, images 1422-1424, and labels 1426-1428. As an example of a call made using device 1400 (FIG. 14A) or 1420, when a call is initiated, an image of the calling user may be captured by image capture aperture 1416 and presented on panel 1406 (i.e., image 1422 and label 1426 ("ME"). Likewise, if the receiving caller has a device that also has substantially similar video conferencing or calling features or functions, image 1424 (i.e., an image of another caller) may be presented on panel 1408 along with a label 1428. Images 1422-1424 may be varied and are not limited to images captured by image capture aperture 1416. For example, an avatar representing a user may also be presented. Further, labels 1426-1428 may also be varied and are not limited to any specific type of text or content. In other examples, device 1420 and the above-described elements may be implemented differently with regard to quantity, composition, function, or configuration and is not limited to those shown and described.

Figure 15:
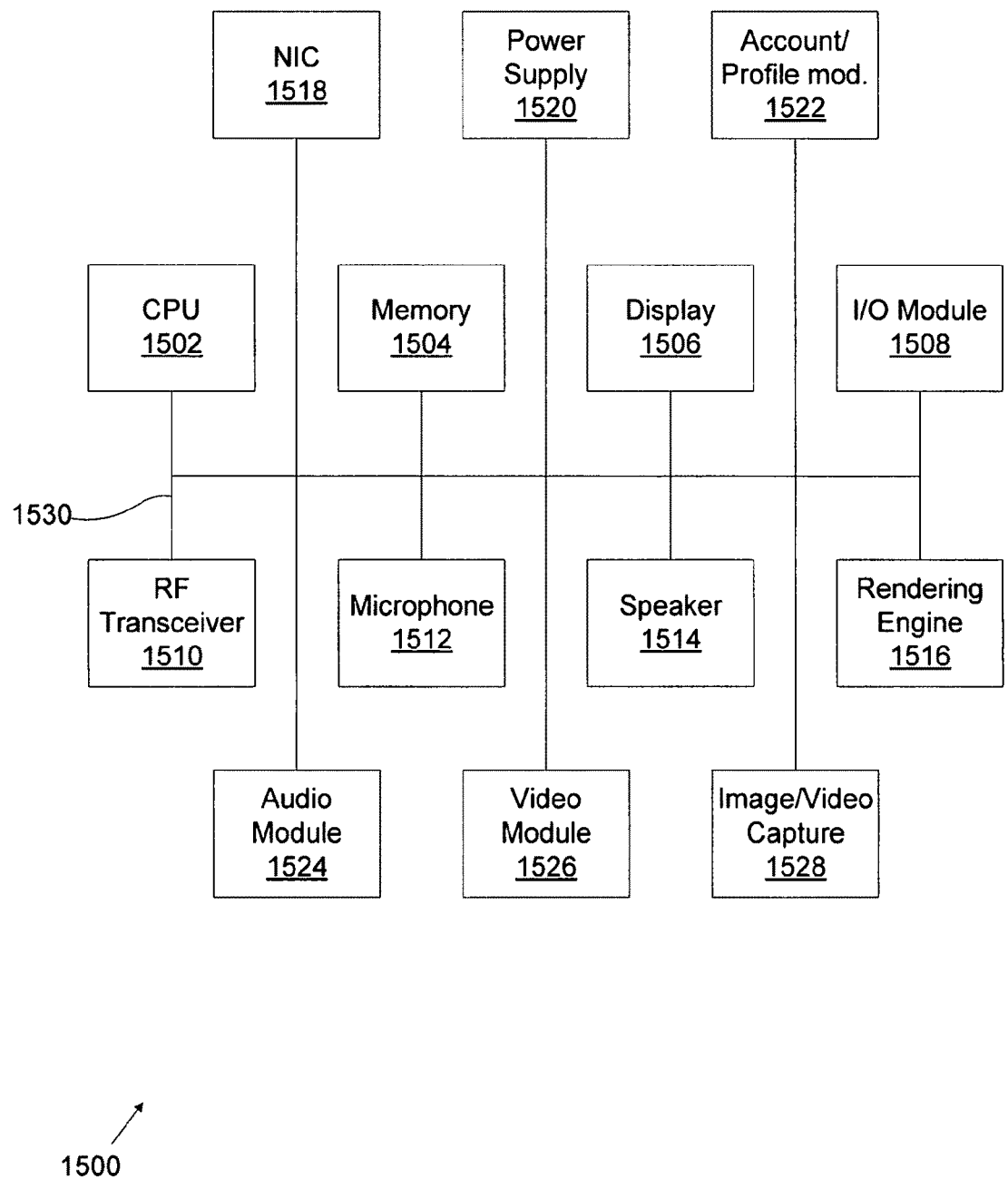
FIG. 15 illustrates an exemplary configurable multi-dimensional media device system.

FIG. 15 illustrates an exemplary configurable multi-dimensional media device system. Here, system 1500 includes central processing unit ("CPU") 1502, memory 1504, display 1506, input/output ("I/O") module 1508, radio frequency ("RF") transceiver, microphone 1512, speaker 1514, rendering engine 1516, network interface card ("NIC") 1518, power supply 1520, account/profile module 1522, audio module 1524, video module 1526, and image/video capture module 1528. The above-described elements are not intended to be an exhaustive or comprehensive set of components that may be used to implement the described techniques. In some examples, processor 1502 may be any type of processing, processor, standalone, or network data processing capability. Memory 1504 may be any type of volatile or non-volatile memory material and system, but is not limited to those types. Display 1506 may be implemented using panels, such as those described above. I/O module 1508 is configured to receive any type of user input or output. Further, RF transceiver may be used to provide wireless data communication functions to allow encoded signals to be sent and received that, when interpreted, allow for the rendering, recording, playback, or other data operations. Microphone 1512 may be used to record audio analog signals that may be modulated/demodulated, encoded, and converted (i.e., using an A/D codec) into digital signals that may be transmitted to other devices using RF transceiver 1510 or stored in memory 1504, or other operations. Likewise speaker 1514 may be implemented using one or more modules to output audio signals and sounds. Rendering engine 1516 may be used to implement data rendering capabilities for displaying images, pictures, video, or other media on display 1506. NIC 1518 may be used to interface devices, such as those described above, with other networked devices, apparatus, or systems. Power supply 1520 may be any type of integrated or removable power supply that provides electrical power to system 1500. Account/profile module 1522 may be used to manage information associated with one or more users of system 1500. Audio module 1524, video module 1526, and image/video capture module 1528 may be used to render, handle, generate, present, or perform other operations on various types of media for the device functions described herein. Further, data bus 1530 may be used to pass signals between elements 1502-1528, as shown and described. In other examples, system 1500 and the above-described elements may be implemented differently with regard to quantity, composition, function, or configuration and is not limited to those shown and described.

Figure 16A:
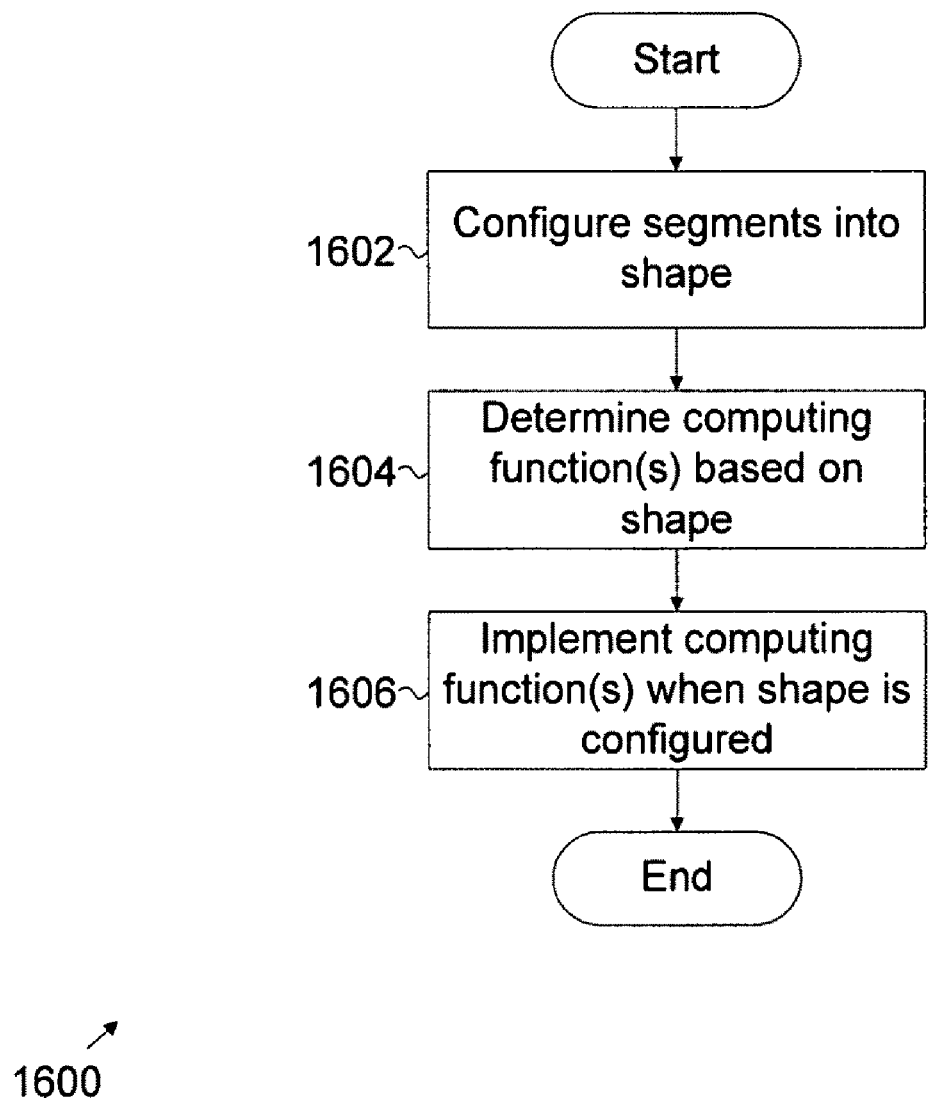
FIG. 16A illustrates an exemplary process for configurable multi-dimensional media device computing.

FIG. 16A illustrates an exemplary process for configurable multi-dimensional media device computing. Here, process 1600 may be used to determine a function to be implemented when a configurable multi-dimensional media device is configured into a given shape. Segments or panels are configured into a shape first (1602). When a shape has been configured using segments of a configurable multi-dimensional media device, one or more computing functions ("functions") may be implemented (1604). For example, if shape 250 (FIG. 2E) is configured using segments 252-260, cell phone functionality may be implemented to enable voice communications. Segment 252 may provide a receiver and speaker (not shown), segment 256 may provide a microphone (not shown), and segment 254 may provide a touchpad to allow a user to enter a telephone number, e-mail address, instant mail address or handle, and the like. Other shapes and configurations may allow different types of functionality (e.g., digital camera, PDA, GPS unit, and others) to be provided by a configurable multi-dimensional media device. Once configured using segments associated with a configurable multi-dimensional media device, one or more computing functions may be implemented (1606). In some examples, a computing function may be any process, sub-process, or set of processes or sub-processes that, when performed, provide for functions and features such as those described above. In other examples, the above-described process may be varied in operations, functions, order, or implementation and is not limited to the descriptions provided.

Figure 16B:
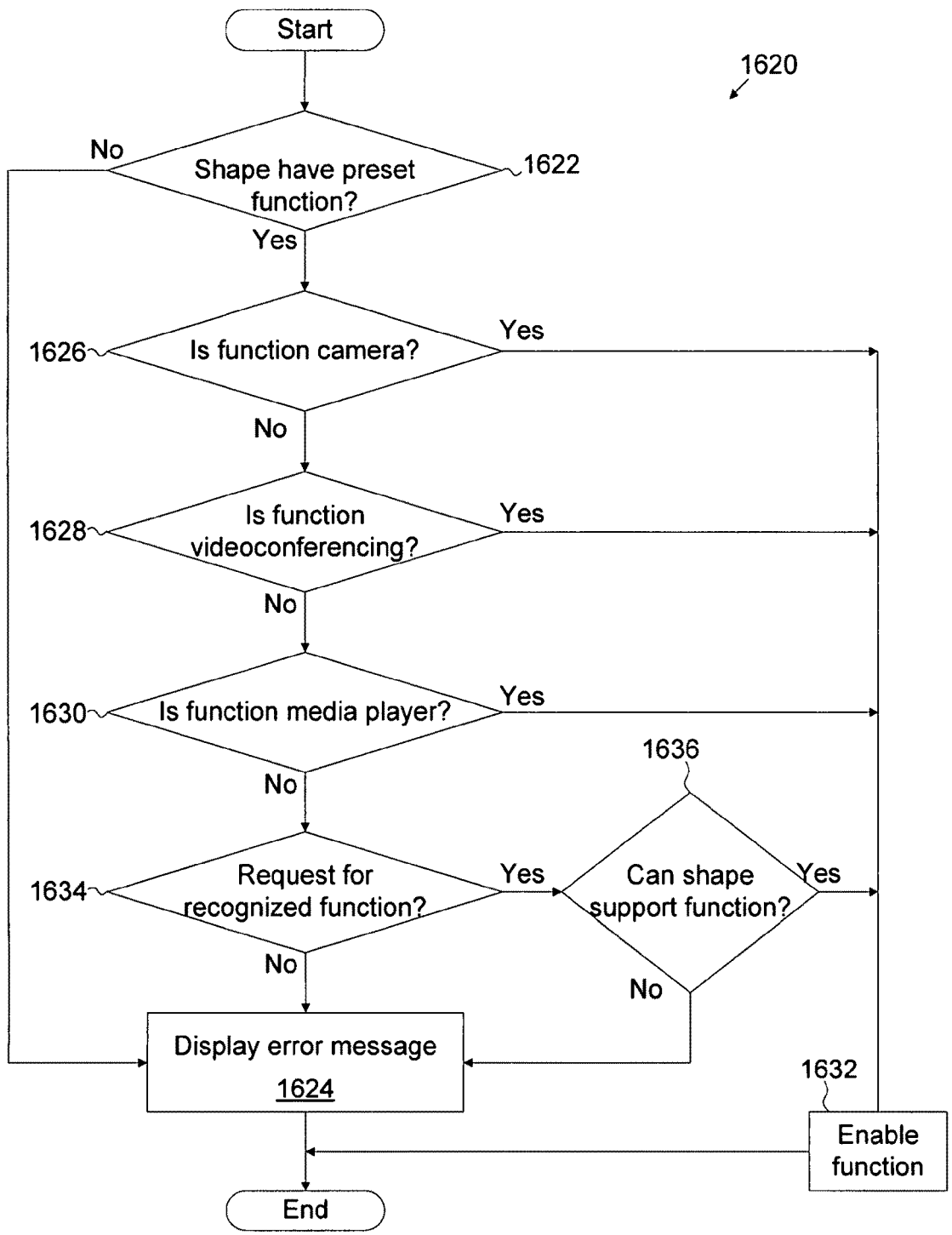
FIG. 16B illustrates a further exemplary process for configurable multi-dimensional media device computing.

FIG. 16B illustrates a further exemplary process for configurable multi-dimensional media device computing. Here, process 1620 may be used as a sub-process of process 1600 for determining a computing (i.e., media processing or media computing) function. In some examples, an initial determination is made as to whether a shape has a pre-set function (1622). A pre-set function may be a pre-determined function (e.g., camera, image recording, media player, videoconferencing, video calling, and others) that, when a device (e.g., devices shown in FIGS. 3-14B) is configured is enabled. If a given function does not have a pre-set function, an error message is displayed (i.e., on a panel) (1624). Alternatively, no error message may be presented and instead no device function is enabled. If a given shape does have a pre-set function, then another determination is made as to whether the function is a camera (1626), videoconferencing system (1628), or media player (1630). If one of these determinations is made that a pre-set function exists, then the function is enabled as shown (1632). However, if these determinations fail, then another determination is made as to whether the shape generates an electrical or electronic request for a recognized function (1634). If the request indicates a recognized function, then another determination is made as to whether the current shape (i.e., configuration) can support the given function (1636). If the shape can support the given function, then the function is enabled. If the shape cannot support the given function or if the shape does not generate a request for a recognized function, then an error message is displayed (1624). Alternatively, if the shape cannot support the given function or does not generate a request for a recognized function, then no error message may be displayed and, instead, no function is enabled. Functions, as described above, may be any type of media operation (e.g., camera, media player, image/video/audio/multimedia recording, videoconferencing, video calling, mobile communications, and others), such as those described above. Further, the above-described process 1620 may be varied in processes, operations, functions, order, or implementation and is not limited to the descriptions provided.

Figure 17:
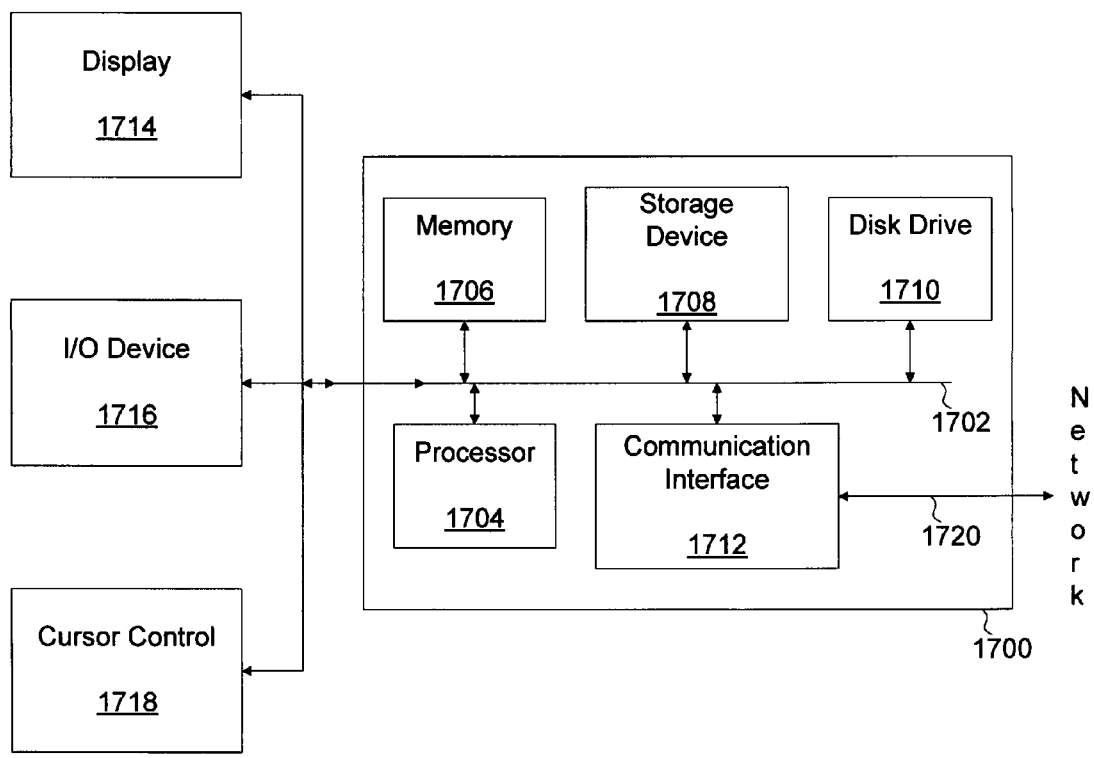
FIG. 17 illustrates an exemplary computing environment suitable for configurable multi-dimensional media computing.

FIG. 17 illustrates an exemplary computing environment suitable for configurable multi-dimensional media computing. In some examples, computer system 1700 may be used to implement computer programs, applications, methods, processes, or other software to perform the above-described techniques. Computer system 1700 includes a bus 1702 or other communication mechanism for communicating information, which interconnects subsystems and devices, such as processor 1704, system memory 1706 (e.g., RAM), storage device 1708 (e.g., ROM), disk drive 1710 (e.g., magnetic or optical), communication interface 1712 (e.g., modem or Ethernet card), display 1714 (e.g., CRT or LCD), input device 1716 (e.g., keyboard), and cursor control 1718 (e.g., mouse or trackball).

According to some examples, computer system 1700 performs specific operations by processor 1704 executing one or more sequences of one or more instructions stored in system memory 1706. Such instructions may be read into system memory 1706 from another computer readable medium, such as static storage device 1708 or disk drive 1710. In some examples, hard-wired circuitry may be used in place of or in combination with software instructions for implementation.

The term "computer readable medium" refers to any medium that participates in providing instructions to processor 1704 for execution. Such a medium may take many forms, including but not limited to, non-volatile media, volatile media, and transmission media. Non-volatile media includes, for example, optical or magnetic disks, such as disk drive 1710. Volatile media includes dynamic memory, such as system memory 1706. Transmission media includes coaxial cables, copper wire, and fiber optics, including wires that comprise bus 1702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 1700. According to some examples, two or more computer systems 1700 coupled by communication link 1720 (e.g., LAN, PSTN, or wireless network) may perform the sequence of instructions in coordination with one another. Computer system 1700 may transmit and receive messages, data, and instructions, including program, i.e., application code, through communication link 1720 and communication interface 1712. Received program code may be executed by processor 1704 as it is received, and/or stored in disk drive 1710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A system, comprising:
a display matrix comprising three or more display panels, wherein each respective one of the display panels is configured to rotate about one or more shared rotational axis with respect to each of other ones of the display panels disposed adjacent the respective one of the display panels such that the three or more display panels are foldable into a plurality of different shapes, wherein each of the shared rotational axes is substantially parallel or substantially orthogonal to each of the other shared rotational axes,
wherein the system is configured to provide a plurality of operating functions, wherein each of the plurality of operating functions is associated with one or more of the plurality of shapes, and wherein the display panels are configured to display one or more functions corresponding to one or more of the plurality of operating functions associated with each particular one of the plurality of shapes; and
a processor configured to:
determine the shape of the display matrix; and
implement one or more of the operating functions associated with the determined shape of the display matrix, wherein implementing one or more of the operating functions associated with the determined shape of the display matrix comprises at least one of the display panels displaying a particular function corresponding to an operating function associated with the determined shape.

2. The system of claim 1, further comprising a memory storing an application, the application being configured to provide at least one of the one or more operating functions when executed.

3. The system of claim 1, wherein at least one of the display panels comprises an audio speaker configured to generate an acoustic signal from data provided by the processor.

4. The system of claim 1, wherein each of the display panels is rectangular in shape.

5. The system of claim 1, wherein each of the display panels is substantially square in shape, and wherein the one or more shared rotational axes are substantially parallel to edges of the substantially square shaped display panels to form a grid of three or more display panels.

6. The system of claim 1, wherein each of the three or more display panels comprises a two-sided display panel having top and bottom display areas facing opposite directions with respect to one another, and wherein each of the top and bottom display areas are configurable to display one or more functions corresponding to one or more of the plurality of operating functions associated with each particular one of the plurality of shapes.

7. The system of claim 1, wherein each of the three or more display panels comprises:
   a top display panel comprising a top display area;
   a bottom display panel comprising a bottom display area, wherein the top and bottom display areas face opposite directions with respect to one another; and
   a membrane disposed between the top and bottom display panels,
   wherein the membrane extends between two or more adjacent display panels, and wherein the membrane is flexible such that the membrane forms a flexible joint between the adjacent display panels to facilitate rotation of the adjacent display panels relative to one another about a respective one of the shared rotational axes.

8. The system of claim 1, wherein the one or more operating functions comprise at least one of image capture, media play, handheld game, image scanning, mobile calling, videoconferencing, video calling, mapping, or mirror.

9. The system of claim 1, wherein the display panels are configured to render one or both of a still image and a video image.

10. A device, comprising:
    a memory configured to store data;
    a display matrix comprising three or more display segments, wherein each of the three or more display segments comprises a two-sided display segment having top and bottom display areas facing opposite directions with respect to one another, and wherein each respective one of the display segments is configured to rotate about one or more shared rotational axis with respect to each of other ones of the display segments disposed adjacent the respective one of the display segments such that the three or more display segments are foldable into a plurality of different shapes,
        wherein the system is configured to provide a plurality of operating functions, wherein each of the plurality of operating functions is associated with one or more of the plurality of shapes, and wherein the display segments are configured to provide a display corresponding to one or more of the plurality of operating functions associated with each particular one of the plurality of shapes; and
    logic configured to:
        determine the shape of the display matrix; and
        implement one or more of the operating functions associated with the determined shape of the display matrix, wherein implementing one or more of the operating functions associated with the determined shape of the display matrix comprises at least one of the display segments providing a display corresponding to an operating function associated with the determined shape.

11. The device of claim 10, wherein each of the display segments is rectangular in shape.

12. The device of claim 10, wherein each of the shared rotational axes is substantially parallel or substantially orthogonal to each of the other shared rotational axes.

13. The device of claim 10, wherein each of the display segments is substantially square in shape, and wherein the one or more shared rotational axes are substantially parallel to edges of the substantially square shaped segments to form a grid of three or more display panels.

14. The device of claim 10, wherein each of the three or more display segments comprises:
    a top display panel comprising the top display area;
    a bottom display panel comprising the bottom display area; and
    a membrane disposed between the top and bottom display panels,
    wherein the membrane extends between two or more adjacent display segments, and wherein the membrane is flexible such that the membrane forms a flexible joint between the adjacent display segments to facilitate rotation of the adjacent display segments relative to one another about a respective one of the shared rotational axes.

15. The device of claim 10, wherein the one or more operating functions comprise at least one of image capture, media play, handheld game, image scanning, mobile calling, videoconferencing, video calling, mapping, or mirror.

16. The device of claim 10, further comprising a memory storing an application, the application being configured to provide at least one of the one or more operating functions when executed.

17. An apparatus, comprising:
    a memory configured to store data associated with one or more operating functions;
    a display matrix comprising a plurality of segments configured to be selectively arranged relative to one another to form a plurality of selected shapes, wherein three or more of the segments comprise display segments, wherein the one or more operating functions are associated with one or more of the plurality of shapes, and wherein each of the three or more display segments are configurable to render two or more different images, wherein the two or more images each correspond to an operating function associated with two or more selected shapes, respectively, of the plurality of selected shapes of the display matrix; and
    a processor configured to:
        determine the selected shape of the display matrix; and
        implement one or more of the operating functions associated with the selected shape of the display matrix, wherein implementing one or more of the operating functions associated with the selected shape of the display matrix comprises at least one of the display segments displaying an image corresponding to an operating function associated with the selected shape.

18. The apparatus of claim 17, wherein the one or more operating functions comprise at least one of image capture, media play, handheld game, image scanning, mobile calling, videoconferencing, video calling, mapping, or mirror.

19. The apparatus of claim 17, wherein each respective one of the segments is configured to rotate about one or more shared rotational axis with respect to each of other ones of the segments disposed adjacent the respective one of the segments such that the segments are foldable into a plurality of different shapes, wherein each of the shared rotational axes is substantially parallel or substantially orthogonal to each of the other shared rotational axes.

20. The apparatus of claim 17, wherein each of the segments is rectangular in shape.

21. The apparatus of claim 17, wherein each of the three or more display segments comprises a two-sided display segment having top and bottom display areas facing opposite directions with respect to one another.

22. A method, comprising:
    detecting a shape of a display matrix comprising three or more display panels, wherein each respective one of the display panels is configured to rotate with respect to each of other ones of the display panels disposed adjacent the respective one of the display panels such that the three or more display panels are foldable into a plurality of different shapes, wherein each of the three or more display panels are configurable to render two or more different images, wherein the two or more images correspond to an operating function associated with two or more selected shapes, respectively, of the plurality of different shapes of the display matrix;

determining one or more operating functions based on the shape detected; and implementing the one or more operating functions determined based on the shape of the display matrix detected, comprising displaying, by at least one of the display panels, a particular function corresponding to an operating function associated with the determined shape.

* * * * *